(12) United States Patent
Kagata et al.

(10) Patent No.: US 8,574,357 B2
(45) Date of Patent: Nov. 5, 2013

(54) WATER RESISTANT ALUMINUM PIGMENT DISPERSION, AQUEOUS INK COMPOSITION CONTAINING THE SAME, AND METHOD FOR MANUFACTURING WATER RESISTANT ALUMINUM PIGMENT DISPERSION

(75) Inventors: Takayoshi Kagata, Shiojiri (JP); Tsuyoshi Sano, Shiojiri (JP); Toshimi Fukui, Otsu (JP); Saori Yamaki, Kawasaki (JP); Junko Nakamoto, Osaka (JP); Hideki Kawasaki, Ritto (JP)

(73) Assignee: Seiko Epson Corporation (JP)

( * ) Notice: Subject to any disclaimer, the term of this patent is extended or adjusted under 35 U.S.C. 154(b) by 54 days.

(21) Appl. No.: 12/755,120

(22) Filed: Apr. 6, 2010

(65) Prior Publication Data

US 2010/0256284 A1    Oct. 7, 2010

(30) Foreign Application Priority Data

Apr. 7, 2009   (JP) .................................. 2009-092970
Nov. 27, 2009  (JP) .................................. 2009-270352
Jan. 26, 2010  (JP) .................................. 2010-014170

(51) Int. Cl.
*C09C 1/64* (2006.01)
*C09D 5/36* (2006.01)

(52) U.S. Cl.
USPC ........ 106/404; 106/31.65; 106/31.9; 106/415

(58) Field of Classification Search
USPC ............... 524/441, 548, 579, 577; 106/31.65, 106/31.9, 404, 415
See application file for complete search history.

(56) References Cited

U.S. PATENT DOCUMENTS

| | | |
|---|---|---|
| 3,023,181 A | 2/1962 | Te Grotenhuis |
| 3,328,481 A | 6/1967 | Vincent |
| 3,821,003 A | 6/1974 | Dittrich et al. |
| 4,213,886 A | 7/1980 | Turner |
| 4,657,067 A | 4/1987 | Rapp et al. |
| 5,156,677 A | 10/1992 | Carpenter et al. |
| 5,340,393 A | 8/1994 | Jacobson |
| 5,415,964 A | 5/1995 | Hayashi et al. |

(Continued)

FOREIGN PATENT DOCUMENTS

| | | |
|---|---|---|
| DE | 10 2005 037 611 A1 | 2/2007 |
| EP | 1862511 A1 | 12/2007 |

(Continued)

OTHER PUBLICATIONS

Li et al. J. Coat. Technol. Res., 5(1) 77-83, 2008.*

(Continued)

*Primary Examiner* — Vu A Nguyen
(74) *Attorney, Agent, or Firm* — Harness, Dickey & Pierce, P.L.C.

(57) ABSTRACT

A water resistant aluminum pigment dispersion includes a water resistant aluminum pigment which is an aluminum pigment covered with a silica film, wherein the water resistant aluminum pigment is formed of an aluminum pigment having an average thickness from 5 nm to 30 nm and a covering film which contains Si and is formed on the surface of the aluminum pigment; and wherein the coverage ratio of the surface of the aluminum pigment by the covering film, calculated from the composition ratio of C, O, Al, and Si detected by XPS measurement at an incident angle of 30°, is in a range from 30% to 90%.

8 Claims, 5 Drawing Sheets

(56) References Cited

U.S. PATENT DOCUMENTS

| | | | |
|---|---|---|---|
| 5,431,720 A | 7/1995 | Nagai et al. | |
| 5,436,083 A | 7/1995 | Haluska et al. | |
| 5,436,084 A | 7/1995 | Haluska et al. | |
| 5,624,486 A | 4/1997 | Schmid et al. | |
| 5,707,433 A | 1/1998 | Kuge et al. | |
| 5,719,204 A | 2/1998 | Beach et al. | |
| 5,725,647 A | 3/1998 | Carlson et al. | |
| 5,873,934 A | 2/1999 | Kunii et al. | |
| 5,900,899 A | 5/1999 | Ichizawa et al. | |
| 5,935,638 A | 8/1999 | Chandra et al. | |
| 5,954,866 A | 9/1999 | Ohta et al. | |
| 5,961,703 A | 10/1999 | Fraas | |
| 6,054,220 A | 4/2000 | Mroz | |
| 6,099,629 A | 8/2000 | Morita et al. | |
| 6,162,497 A | 12/2000 | Beane et al. | |
| 6,176,918 B1 | 1/2001 | Glausch et al. | |
| 6,308,040 B1 | 10/2001 | Mizuno | |
| 6,582,763 B1 | 6/2003 | Nishimura et al. | |
| 6,709,095 B2* | 3/2004 | Sago et al. | 347/100 |
| 6,783,222 B2* | 8/2004 | Kato et al. | 347/100 |
| 6,821,329 B2 | 11/2004 | Choy | |
| 6,838,495 B2 | 1/2005 | Gatti et al. | |
| 6,902,267 B2 | 6/2005 | Ohya et al. | |
| 6,951,075 B2 | 10/2005 | Babler et al. | |
| 6,997,979 B2 | 2/2006 | Bauer et al. | |
| 7,125,447 B2 | 10/2006 | Sugita et al. | |
| 7,166,271 B2 | 1/2007 | Zapf et al. | |
| 7,303,619 B2 | 12/2007 | Oyanagi | |
| 7,381,758 B2 | 6/2008 | Vuarnoz et al. | |
| 7,419,538 B2 | 9/2008 | Li et al. | |
| 7,449,239 B2 | 11/2008 | Seeger et al. | |
| 7,604,693 B2 | 10/2009 | Oyanagi et al. | |
| 7,622,157 B2 | 11/2009 | Falk et al. | |
| 7,645,404 B2 | 1/2010 | Paar et al. | |
| 7,763,108 B2 | 7/2010 | Oyanagi et al. | |
| 7,919,032 B2 | 4/2011 | Yamaguchi et al. | |
| 8,167,161 B2 | 5/2012 | Ichimura et al. | |
| 8,313,572 B2 | 11/2012 | Oyanagi et al. | |
| 8,361,217 B2 | 1/2013 | Voit et al. | |
| 2003/0055127 A1 | 3/2003 | Chen et al. | |
| 2003/0083453 A1 | 5/2003 | Lukacs et al. | |
| 2003/0231234 A1 | 12/2003 | Ushirogouchi et al. | |
| 2004/0041893 A1 | 3/2004 | Hoshino | |
| 2004/0130606 A1 | 7/2004 | Tawaraya et al. | |
| 2004/0257420 A1 | 12/2004 | Ichizawa et al. | |
| 2004/0266907 A1 | 12/2004 | Sugita et al. | |
| 2005/0074611 A1 | 4/2005 | Kuehnle et al. | |
| 2005/0090581 A1 | 4/2005 | Oyanagi | |
| 2005/0148685 A1 | 7/2005 | Yamamoto | |
| 2005/0150424 A1 | 7/2005 | Kasai | |
| 2005/0150864 A1 | 7/2005 | Stasiak et al. | |
| 2005/0151815 A1 | 7/2005 | Kanai et al. | |
| 2005/0166795 A1 | 8/2005 | Ito et al. | |
| 2005/0279255 A1 | 12/2005 | Suzuki et al. | |
| 2006/0111466 A1 | 5/2006 | Bujard et al. | |
| 2006/0142415 A1 | 6/2006 | Ylitalo et al. | |
| 2006/0150864 A1 | 7/2006 | Hashizume et al. | |
| 2006/0167138 A1 | 7/2006 | Ishii et al. | |
| 2007/0026224 A1 | 2/2007 | Seeger et al. | |
| 2007/0044684 A1 | 3/2007 | Nakano et al. | |
| 2007/0128438 A1 | 6/2007 | Fujiyasu et al. | |
| 2007/0251424 A1 | 11/2007 | Handrosch et al. | |
| 2008/0047463 A1 | 2/2008 | Tanoue et al. | |
| 2008/0145628 A1 | 6/2008 | Oyanagi et al. | |
| 2008/0249209 A1 | 10/2008 | Trummer et al. | |
| 2008/0250970 A1 | 10/2008 | Oyanagi et al. | |
| 2008/0318012 A1 | 12/2008 | Domnick et al. | |
| 2009/0162750 A1 | 6/2009 | Kawakami et al. | |
| 2009/0214833 A1 | 8/2009 | Oyanagi et al. | |
| 2009/0264575 A1 | 10/2009 | Henglein et al. | |
| 2010/0183809 A1 | 7/2010 | Oyanagi et al. | |
| 2010/0251929 A1 | 10/2010 | Kagata et al. | |
| 2010/0289859 A1 | 11/2010 | Oyanagi et al. | |
| 2010/0305245 A1 | 12/2010 | Brand et al. | |
| 2011/0025783 A1 | 2/2011 | Oyanagi et al. | |
| 2011/0181656 A1 | 7/2011 | Oyanagi et al. | |
| 2012/0074093 A1 | 3/2012 | Ichimura et al. | |
| 2012/0098911 A1 | 4/2012 | Oyanagi et al. | |
| 2012/0103230 A1 | 5/2012 | Oyanagi et al. | |

FOREIGN PATENT DOCUMENTS

| | | |
|---|---|---|
| EP | 1942158 A2 | 7/2008 |
| EP | 2 017 310 A1 | 1/2009 |
| JP | 7-290639 A | 11/1995 |
| JP | 08-259847 | 10/1996 |
| JP | 08283604 A | 10/1996 |
| JP | 323223 A | 11/1999 |
| JP | 2000-502401 A | 2/2000 |
| JP | 2001-26801 A | 1/2001 |
| JP | 2001-164150 A | 6/2001 |
| JP | 2001-262003 A | 9/2001 |
| JP | 2002179960 A | 6/2002 |
| JP | 2003-049091 A | 2/2003 |
| JP | 2003041150 A | 2/2003 |
| JP | 2003-147226 A | 5/2003 |
| JP | 2003292836 A | 10/2003 |
| JP | 2003306625 A | 10/2003 |
| JP | 2004-099841 A | 4/2004 |
| JP | 2004-131542 | 4/2004 |
| JP | 2004-131542 A | 4/2004 |
| JP | 2004155979 A | 6/2004 |
| JP | 2004-292690 A | 10/2004 |
| JP | 2005-014330 A | 1/2005 |
| JP | 2005501955 A | 1/2005 |
| JP | 2005-68250 | 3/2005 |
| JP | 2005-68251 | 3/2005 |
| JP | 2005-162771 A | 6/2005 |
| JP | 2006-137864 A | 6/2006 |
| JP | 2007-045452 | 2/2007 |
| JP | 2007138053 A | 6/2007 |
| JP | 2007204692 A | 8/2007 |
| JP | 2007297621 A | 11/2007 |
| JP | 2008-516023 A | 5/2008 |
| JP | 2008-174712 | 7/2008 |
| JP | 2008-201624 A | 9/2008 |
| JP | 2008201821 A | 9/2008 |
| JP | 2008208332 A | 9/2008 |
| JP | 2009-122650 A | 6/2009 |
| JP | 2010-202709 A | 9/2010 |
| WO | WO-9813426 A1 | 4/1998 |
| WO | WO-03020834 A1 | 3/2003 |
| WO | 2004/035684 A2 | 4/2004 |
| WO | WO-2004096921 A1 | 11/2004 |
| WO | 2005/063897 A2 | 7/2005 |
| WO | 2005-111159 | 11/2005 |
| WO | 2006-101054 | 9/2006 |
| WO | WO-2007-020364 A1 | 2/2007 |
| WO | 2007/045452 A2 | 4/2007 |
| WO | WO-2009015788 A2 | 2/2009 |

OTHER PUBLICATIONS

BASF Pigment Disperser MD 20 Technical Information (Jul. 2003).*
European Search Report in respect of counterpart EP Application No. 10159208.7.
English Patent Abstract of Publication No. 2005-068251 Published Mar. 17, 2005.
English Patent Abstract of Publication No. 2005-068250 Published Mar. 17, 2005.
English Patent Abstract of Publication No. 2008-174712 Published Jul. 31, 2008.
English Patent Abstract of Publication No. 2004-131542 Published Apr. 30, 2004.
Computer Generated Translation of Japanese Application No. 2004-131542A Published Apr. 30, 2004.
Office Action in Copending U.S. Appl. No. 13/081,574, Sep. 21, 2011.
Partial European Search Report of European Application 07024537.8 issued Apr. 15, 2008.
Berict der Fa. Eckart uber Herstellung eines Metalleffektpigments, Nov. 14, 2011.

(56) References Cited

OTHER PUBLICATIONS

Berict der Fa. Eckart zu den ermittelten GroBenwerten, Nov. 16, 2011.
Berict der Fa. Eckart zur Auswertung der GroBenverteilungsdaten, Nov. 16, 2011.
Kittel, H., "Lehrbuch der Lacke and Beschichtungen, Band 5" Leipzig: S. Hirzel Verlag Stuttgart, 2003.
Hartung, "Lehr-und Handbuch der angewandten Statistik" Muchen: Oldenbourg, 2005.
Extended European Search Reported Issued Nov. 3, 2011.
Extended Search Report of European Application 10014034.2 Issued May 4, 2011.
Partial European Search Report of Application 10016140.5 Issued May 24, 2011.
Partial European Search Report of European Application 07024538.6 issued Apr. 15, 2008.
European Search Report in respect of counterpart EP Application No. 10159206.1 5 pages, Jun. 2010.
European Search Report in respect of counterpart EP Application No. 10159208.7 6 pages, Jun. 2010.

* cited by examiner

WATER RESISTANT ALUMINUM PIGMENT DISPERSION, AQUEOUS INK COMPOSITION CONTAINING THE SAME, AND METHOD FOR MANUFACTURING WATER RESISTANT ALUMINUM PIGMENT DISPERSION

BACKGROUND

1. Technical Field

The present invention relates to a water resistant aluminum pigment dispersion, an aqueous ink composition containing the same, and a method for manufacturing a water resistant aluminum pigment dispersion.

2. Related Art

Heretofore, as a method for forming a coating film having a metallic gloss on a printed material, for example, a method using a printing ink in which a gold powder or a silver powder formed, for example, from a brass or an aluminum fine powder is contained as a pigment, a foil press printing method using a metal foil, or a thermal transfer method using a metal foil may be mentioned.

In recent years, many applications of ink jet techniques have been performed in printing fields, and as one of the applications, metallic printing may be mentioned, so that development of an ink having a metallic gloss has been carried out. For example, in JP-A-2008-174712, an aluminum pigment dispersion containing an organic solvent, such as an alkylene glycol, as a basic component and a non-aqueous ink composition containing the above dispersion have been disclosed.

On the other hand, in views of global environmental conservation, safety for human beings, and the like, instead of a non-aqueous ink composition containing an organic solvent as a basic component, development of an aqueous ink composition has been actually desired. However, when an aluminum pigment is dispersed in water, it generates a hydrogen gas and also forms alumina by a reaction with water, and whitening occurs thereby. As a result, in the aluminum pigment, its metallic gloss may be disadvantageously degraded in some cases.

Accordingly, for example, in JP-A-2004-131542, a technique has been disclosed in which after the surface of an aluminum pigment is covered with a hydrolysis-condensation product containing a siloxane bond, the aluminum pigment is dispersed in water or an aqueous solvent containing a surfactant.

However, when an aluminum pigment provided with siloxane bonds on the surface thereof is dispersed in an aqueous solvent, particles of the aluminum pigment may agglomerate with each other, and/or a metallic gloss of the aluminum pigment may be degraded in some cases due to the agglomeration.

SUMMARY

An advantage of some aspects of the invention is to provide a water resistant aluminum pigment dispersion which prevents whitening when blended with an aqueous paint or an aqueous ink composition and which has superior water dispersibility and metallic gloss.

The invention can be realized as the following embodiments or application examples.

APPLICATION EXAMPLE 1

According to one aspect of the invention, there is provided a water resistant aluminum pigment dispersion including a water resistant aluminum pigment which is an aluminum pigment covered with a silica film, and in this water resistant aluminum pigment dispersion, the water resistant aluminum pigment is dispersed in an aqueous solution containing at least one selected from the group consisting of a copolymer A including a structural unit represented by the following general formula (1) or the following formula (2) and a structural unit represented by the following general formula (3), a copolymer B including a structural unit represented by the following general formula (1) or the following formula (2) and a structural unit represented by the following general formula (4), and a copolymer C including a structural unit represented by the following general formula (1) or the following formula (2) and a structural unit represented by the general formula (5).

In the formula, $A_1$ and $A_2$ each independently indicate hydrogen, an alkali metal, or ammonium.

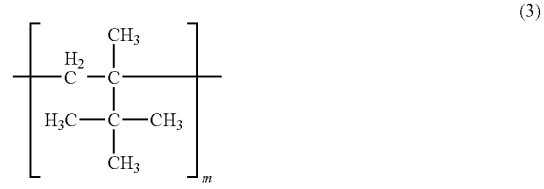

In the formula, m indicates an integer of 1 to 5.

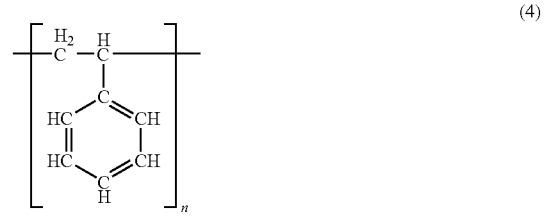

In the formula, n indicates an integer of 1 to 5.

In the formula, o indicates an integer of 1 to 5, and R indicates an alkyl group.

According to the water resistant aluminum pigment dispersion of Application Example 1, since the silica film is formed on the surface of the aluminum pigment, a water resistance is imparted thereto, and even when the aluminum pigment is blended with an aqueous paint or an aqueous ink composition, the metallic gloss is not degraded. In addition, since the aluminum pigment covered with the silica film is dispersed in an aqueous solution containing at least one selected from the group consisting of the copolymer A, the copolymer B, and the copolymer C, a water resistant aluminum pigment dispersion having superior water dispersibility can be obtained without degrading the water resistance and the metallic gloss.

APPLICATION EXAMPLE 2

According to Application Example 1, the aluminum pigment may include plate-shaped particles having an average thickness of 5 to 30 nm and a 50% average particle diameter of 0.5 to 3 μm.

APPLICATION EXAMPLE 3

According to Application Example 1 or 2, the silica film may have a thickness of 0.5 to 10 nm.

APPLICATION EXAMPLE 4

According to one of Application Examples 1 to 3, the water resistant aluminum pigment may be the aluminum pigment processed by a surface treatment using tetraethoxysilane.

APPLICATION EXAMPLE 5

According to one of Application Examples 1 to 4, the copolymer A, the copolymer B, and the copolymer C each may have a weight average molecular weight of 2000 to 500,000.

APPLICATION EXAMPLE 6

According to one of Application Examples 1 to 5, the total of the contents of the copolymer A, the copolymer B, and the copolymer C may be 0.02 to 1.5 parts by mass with respect to 1 part by mass of the aluminum pigment.

APPLICATION EXAMPLE 7

According to another aspect of the invention, there is provided an aqueous ink composition which comprises the water resistant aluminum pigment dispersion according to one of Application Examples 1 to 6.

APPLICATION EXAMPLE 8

According to another aspect of the invention, there is provided a method for manufacturing a water resistant aluminum pigment dispersion comprising: a first step of adding tetraethoxysilane to an aluminum pigment dispersion in which an aluminum pigment is dispersed in an organic solvent to form a silica film on the surface of the aluminum pigment by a reaction between a hydroxyl group present on the surface of the aluminum pigment and the tetraethoxysilane; a second step of removing at least part of the organic solvent; and a third step of adding an aqueous surfactant solution.

According to the water resistant aluminum pigment dispersion of Application Example 8, since the silica film is formed on the surface of the aluminum pigment, a water resistance is imparted thereto, and even when the aluminum pigment is blended with an aqueous paint or an aqueous ink composition, the metallic gloss is not degraded. In addition, since the aluminum pigment covered with the silica film is dispersed in the aqueous surfactant solution, a water resistant aluminum pigment dispersion having superior water dispersibility can be obtained without degrading the water resistance and the metallic gloss.

APPLICATION EXAMPLE 9

According to Application Example 8, the surfactant may be at least one of a polycarboxylic acid and a salt thereof.

APPLICATION EXAMPLE 10

According to Application Example 9, the polycarboxylic acid and the salt thereof may be at least one selected from the group consisting of a copolymer A including a structural unit represented by the following general formula (1) or the following formula (2) and a structural unit represented by the following general formula (3), a copolymer B including a structural unit represented by the following general formula (1) or the following formula (2) and a structural unit represented by the following general formula (4), and a copolymer C including a structural unit represented by the following general formula (1) or the following formula (2) and a structural unit represented by the general formula (5).

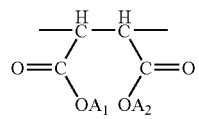
(1)

In the formula, $A_1$ and $A_2$ each independently indicate hydrogen, an alkali metal, or ammonium.

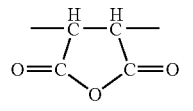
(2)

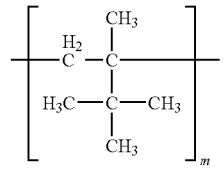
(3)

In the formula, m indicates an integer of 1 to 5.

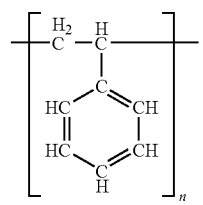
(4)

In the formula, n indicates an integer of 1 to 5.

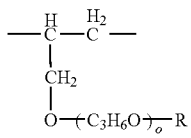

(5)

In the formula, o indicates an integer of 1 to 5, and R indicates an alkyl group.

APPLICATION EXAMPLE 11

According to one of Application Examples 8 to 10, the first step, the second step, and the third step may be performed in that order.

APPLICATION EXAMPLE 12

According to one of Application Examples 8 to 11, the aluminum pigment may include plate-shaped particles having an average thickness of 5 to 30 nm and a 50% average particle diameter of 0.5 to 3 µm.

APPLICATION EXAMPLE 13

According to one of Application Examples 8 to 12, the silica film may have a thickness of 0.5 to 10 nm.

APPLICATION EXAMPLE 14

According to one of Application Examples 10 to 13, the copolymer A, the copolymer B, and the copolymer C each may have a weight average molecular weight of 200 to 500,000.

APPLICATION EXAMPLE 15

According to one of Application Examples 8 to 14, the addition amount of the surfactant may be 0.02 to 1.5 parts by mass with respect to 1 part by mass of the aluminum pigment.

APPLICATION EXAMPLE 16

According to one of Application Examples 8 to 15, the organic solvent may include diethylene glycol diethyl ether.

APPLICATION EXAMPLE 17

According to one of Application Examples 8 to 16, in the first step, ammonia may be added.

APPLICATION EXAMPLE 18

According to one of Application Examples of 8 to 17, in the second step, the aluminum pigment provided with the silica film may be separated from the organic solvent by centrifugal separation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
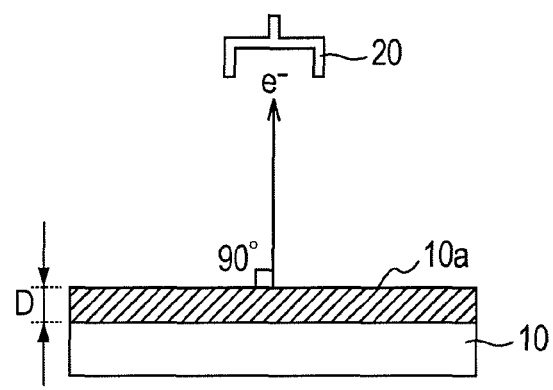
FIGS. 1A and 1B are views each schematically showing a photoelectron takeoff angle in XPS measurement.

Hereinafter, preferable embodiments of the invention will be described. The embodiments described below are examples for explaining the invention. In addition, the invention is not limited to the following embodiments and also includes various modified examples performed without departing from the scope of the invention.

1. Method for Manufacturing Water Resistant Aluminum Pigment Dispersion

A method for manufacturing a water resistant aluminum pigment dispersion according to one embodiment of the invention comprises a first step of adding tetraethoxysilane to an aluminum pigment dispersion in which an aluminum pigment is dispersed in an organic solvent to form a silica film on the surface of the aluminum pigment by a reaction between a hydroxyl group present on the surface of the aluminum pigment and the tetraethoxysilane; a second step of removing at least part of the organic solvent; and a third step of adding an aqueous surfactant solution.

Hereinafter, the above individual steps will be described in detail.

1.1 First Step

First, by the following steps (1) and (2), an aluminum pigment dispersion in which an aluminum pigment is dispersed in an organic solvent is prepared.

(1) A composite pigment base is prepared which has the structure in which a peeling resin layer and an aluminum or an aluminum alloy layer (hereinafter simply referred to as "aluminum layer") are sequentially laminated on a sheet-shaped substrate.

Although the sheet-shaped substrate is not particularly limited, for example, there may be mentioned a mold releasing film, such as a polyolefin film of a poly(tetrafluoroethylene), a polyethylene, a polypropylene, or the like, a polyester film of a poly(ethylene terephthalate) or the like, a polyamide film of a nylon 66, a nylon 6, or the like, a polycarbonate film, a triacetate film, or a polyimide film. Among those mentioned above, a film of a poly(ethylene terephthalate) or a copolymer thereof is preferable.

Although the thickness of the sheet-shaped substrate is not particularly limited, it is preferably in the range of 10 to 150 µm. When the thickness is 10 µm or more, handling of the substrate in the steps or the like may not cause any problems, and when the thickness is 150 µm or less, since having sufficient flexibility, the substrate may be, for example, rolled up or peeled away without causing any problems.

The peeling resin layer is an undercoat layer for the aluminum layer and is also a peeling promotion layer to promote the peeling from the sheet-shaped substrate. As a resin used for this peeling resin layer, for example, a poly(vinyl alcohol), a poly(vinyl butyral), a poly(ethylene glycol), a poly(acrylic acid), a poly(acryl amide), a cellulose derivative, or a modified nylon resin is preferable.

When a solution containing at least one of the resins mentioned above by way of example is applied to the sheet-shaped substrate and is then dried, the peeling resin layer can be formed. After the application, an additive, such as a viscosity modifier, may also be added.

The application of the peeling resin layer may be performed by a known technique, such as gravure application, roll application, blade application, extrusion application, dip application, or spin coat application, which has been generally used. After the application and drying, whenever necessary, the surface may be smoothed by a calendering treatment.

Although the thickness of the peeling resin layer is not particularly limited, it is preferably in the range of 0.5 and 50 µm and more preferably in the range of 1 and 10 µm. When the thickness is less than 0.5 µm, the amount is not sufficient as a dispersing resin, and when the thickness is more than 50 µm, peeling is liable to occur at the interface with the pigment layer when being rolled up therewith.

As a method for laminating the aluminum layer, a vacuum deposition, an ion plating, or a sputtering method is preferably used.

In addition, as exemplified in JP-A-2005-68250, the aluminum layer may be sandwiched by protective layers. As the protective layer, for example, a silicon oxide layer or a protective resin layer may be mentioned.

The silicon oxide layer is not particularly limited as long as it contains silicon oxide but is preferably formed by a sol-gel method from a silicon alkoxide, such as a tetraalkoxysilane, or a polymer thereof. When an alcohol solution dissolving a silicon alkoxide or a polymer thereof is applied and is then fired by heating, a coating film of a silicon oxide layer is formed.

For the protective resin layer, any resin may be used as long as it is not dissolved in a dispersion medium, and for example, a poly(vinyl alcohol), a poly(ethylene glycol), a poly(acrylic acid), a poly(acryl amide), or a cellulose derivative may be mentioned. Among those mentioned above, a poly(vinyl alcohol) or a cellulose derivative is preferably used.

When an aqueous solution containing at least one of the resins mentioned above by way of example is applied and is then dried, the protective resin layer can be formed. After the application, an additive, such as a viscosity modifier, may be added. The application of the silicon oxide and the resin is performed by a method similar to that for the application of the peeling resin layer.

The thickness of the protective layer is not particularly limited but is preferably in the range of 50 to 150 nm. When the thickness is less than 50 nm, the mechanical strength is not sufficient, and when the thickness is more than 150 nm, since the strength is excessively increased, pulverization/dispersion cannot be easily performed, so that peeling may occur at the interface with the aluminum layer in some cases.

In addition, as exemplified in JP-A-2005-68251, a coloring layer may also be provided between the "protective layer" and the "aluminum layer".

The coloring layer is provided to obtain an optional color composite pigment and is not particularly limited as long as it contains a coloring material which can impart optional color tone and hue in addition to the metallic gloss, brightness, and background masking properties of the aluminum pigment used in this embodiment. As the coloring material used for this coloring layer, either a dye or a pigment may be used. In addition, as the dye or the pigment, a known material may be appropriately used.

In this case, the "pigment" used for the coloring layer indicates a natural pigment, a synthetic organic pigment, a synthetic inorganic pigment, or the like which is defined in general engineering fields.

A method for forming the coloring layer is not particularly limited, but the coloring layer is preferably formed by coating. In addition, when the coloring material used for the coloring layer is a pigment, a coloring-material dispersion resin is preferably further contained. When the coloring-material dispersion resin is used, a resin thin film is preferably formed in such a way that after the pigment, the coloring-material dispersion resin, and whenever necessary, other additives or the like are dispersed or dissolved in a solvent to form a solution, a uniform liquid film is formed by spin coating of this solution, and drying is then performed. In addition, when the composite pigment base is manufactured, the coloring layer and the protective layer are preferably both formed by coating in view of working efficiency.

The composite pigment base may also have a layer structure which includes a plurality of sequential lamination structures in each of which the peeling resin layer and the aluminum layer are sequentially laminated. In this case, the total thickness of the lamination structures including a plurality of aluminum layers, that is, the thickness of the aluminum layer-peeling resin layer-aluminum layer, which is obtained by removing the sheet-shaped substrate and the peeling resin layer provided immediately thereon, or the thickness of the peeling resin layer-aluminum layer is preferably 5,000 nm or less. When the thickness is 5,000 nm or less, even if the composite pigment base is wound in the form of a roll, cracking and peeling are not likely to occur, and the storage stability is superior. In addition, when the composite pigment base is formed into a pigment, it is preferable since the metallic gloss is excellent. Although a structure in which the peeling resin layers and the aluminum layers are sequentially laminated on two surfaces of the sheet-shaped substrate may also be mentioned by way of example, the structure is not limited to those described above.

(2) Next, when the sheet-shaped substrate of the composite pigment base is peeled away therefrom at the interface between the sheet-shaped substrate and the peeling resin layer in an organic solvent, and the remaining portion is processed by a pulverization or a particularization treatment, an aluminum pigment dispersion containing large and coarse particles is obtained. Furthermore, when the aluminum pigment dispersion thus obtained is filtrated to remove large and coarse particles, an aluminum pigment dispersion containing flat-shaped aluminum particles can be obtained.

As the organic solvent, any solvent may be used as long as it does not impair the dispersion stability of the aluminum pigment and/or the reactivity with tetraethoxysilane which will be described later, but a polar organic solvent is preferable. As the polar organic solvent, for example, alcohols (methyl alcohol, ethyl alcohol, propyl alcohol, butyl alcohol, isopropyl alcohol, fluorinated alcohols, and the like), ketones (acetone, methyl ethyl ketone, cyclohexanone, and the like), carboxylic acid esters (methyl acetate, ethyl acetate, propyl acetate, butyl acetate, methyl propionate, ethyl propionate, and the like), and ethers (diethyl ether, dipropyl ether, tetrahydrofuran, dioxane, and the like) may be mentioned.

Among the polar organic solvents mentioned above by way of example, an alkylene glycol monoether or an alkylene glycol diether which is a liquid at ordinary temperature and pressure is more preferable.

As the alkylene glycol monoether, for example, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, or dipropylene glycol monoethyl ether may be mentioned.

As the alkylene glycol diether, for example, ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, or dipropylene glycol diethyl ether may be mentioned.

Among those mentioned above, since having superior dispersibility stability of the aluminum pigment, triethylene glycol monobutyl ether or diethylene glycol diethyl ether is more preferable. In addition, since preserving the gloss of the aluminum pigment and imparting the water resistance thereto, diethylene glycol diethyl ether is particularly preferable.

Although a peeling treatment performed on the sheet-shaped substrate is not particularly limited, there may be preferably mentioned a method in which peeling is performed by immersing the composite pigment base in a liquid or a method in which when the composite pigment base is immersed in a liquid, an ultrasonic treatment is simultaneously performed to implement a peeling treatment and a pulverization treatment of the peeled composite pigment.

In the aluminum pigment including plate-shaped particles obtained as described above, the peeling resin layer functions as protective colloid, and a stable dispersion can be obtained only by performing a dispersing treatment in an organic solvent. In addition, when the aluminum pigment is used for an aqueous ink composition, a resin derived from the peeling resin layer may also function to impart adhesion on a recording medium to the ink composition.

In order to impart superior water resistance and metallic gloss, the aluminum pigment in the aluminum pigment dispersion obtained by the steps described above preferably includes plate-shaped particles.

When the long diameter, the short diameter, and the thickness of an aluminum particle are represented by X, Y, and Z, respectively, the "plate-shaped particle" indicates a particle having an approximately flat surface (X-Y plain surface) and having an approximately constant thickness (Z). In more particular, the "plate-shaped particle" indicates that a 50% average particle diameter R50, which is the diameter of a corresponding circle obtained by calculation from the areas of the approximately flat surfaces (X-Y plain surfaces) of the aluminum particles, is in the range of 0.5 to 3 μm and that the thickness (Z) is in the range of 5 to 30 nm.

The "diameter of a corresponding circle" is the diameter of a circle which is assumed to have the same projection area as the projection area of an aluminum particle having an approximately flat surface (X-Y plain surface). For example, when an approximately flat surface (X-Y plain surface) of an aluminum particle has a polygonal shape, a circle having the same projection area as that of the polygonal shape is assumed, and the diameter of this circle is the "diameter of a corresponding circle of this aluminum particle".

In order to ensure a superior metallic gloss and printing stability, the 50% average particle diameter R50 of a corresponding circle obtained by calculation from the areas of the approximately flat surfaces (X-Y plain surfaces) of the plate-shaped particles is preferably in the range of 0.5 to 3 μm and more preferably in the range of 0.75 to 2 μm. When R50 is less than 0.5 μm, the metallic gloss may not be sufficient in some cases. On the other hand, when R50 is more than 3 μm, the printing stability may be degraded in some cases.

The maximum particle diameter of a corresponding circle obtained by calculation from the areas of approximately flat surfaces (X-Y plain surfaces) of the plate-shaped particles is preferably 10 μm or less. When the maximum particle diameter is set to 10 μm or less, nozzles of an ink jet recording apparatus, foreign-substance removing filters provided in ink flow paths, and the like are prevented from being clogged with the plate-shaped particles.

The long diameter X and the short diameter Y on the plain surface of each of the plate-shaped particles can be measured by a particle image analyzer. As the particle image analyzer, for example, a flow type particle image analyzer FPIA-2100, FPIA-3000, or FPIA-3000S (manufactured by Sysmex Corporation) may be mentioned.

The particle size distribution (CV value) of the plate-shaped particles can be obtained by the following formula (6).

$$CV\ value = (\text{Standard deviation of particle size distribution/average particle diameter}) \times 100 \quad (6)$$

The CV value is preferably 60 or less, more preferably 50 or less, and particularly preferably 40 or less. When plate-shaped particles having a CV value of 60 or less are selected, a superior printing stability can be obtained.

In order to ensure the metallic gloss, the thickness (Z) is preferably 5 to 30 nm and more preferably 10 to 25 nm. If the thickness (Z) is less than 5 nm, when a silica film is formed on the surface of the aluminum particle, the metallic gloss tends to decrease. On the other hand, when the thickness (Z) is more than 30 nm, the metallic gloss also tends to decrease.

In view of the cost and in order to ensure the metallic gloss, the aluminum pigment is preferably composed of aluminum or an aluminum alloy. When an aluminum alloy is used, as another metal or non-metal element to be added besides aluminum, for example, silver, gold, platinum, nickel, chromium, tin, zinc, indium, titanium, or copper may be mentioned.

In this case, a step of washing an aluminum pigment contained in the aluminum pigment dispersion may be provided. For washing of the aluminum pigment, the organic solvent mentioned above may be used.

The peeling resin layer described above may be contained in the aluminum pigment dispersion, or the peeling resin layer may be adhered thereto in some cases. A component contained in the peeling resin layer may disturb a reaction between the aluminum pigment and tetraethoxysilane which will be described later. Hence, when the component of the peeling resin layer is removed by washing the aluminum pigment, the reactivity between the aluminum pigment and tetraethoxysilane which will be described later can be improved.

A washing method of the aluminum pigment is not particularly limited, and for example, washing may be performed as described below.

First, at least part of the organic solvent is removed from the above aluminum pigment dispersion. For the removal of the organic solvent, by operation, such as filtration, centrifugal sedimentation, or centrifugal separation, the organic solvent and the aluminum pigment are separated from each other, so that the organic solvent contained in the aluminum pigment dispersion is removed.

Next, after an organic solvent for washing is added to the aluminum pigment so as to be dispersed therein, the organic solvent for washing is removed. In addition, the step of dispersing the aluminum pigment in the solvent for washing and the step of removing the organic solvent for washing may be performed at least twice.

Subsequently, when the organic solvent mentioned above is added so that the aluminum pigment is dispersed therein, an aluminum pigment dispersion containing a washed aluminum pigment can be obtained.

(3) Next, tetraethoxysilane (hereinafter also referred to as "TEOS") is added in the aluminum pigment dispersion and is then stirred. Accordingly, a hydrolysis reaction occurs between TEOS and a hydroxyl group present on the surface of the aluminum pigment, so that a silica film can be formed on the surface of the aluminum pigment. When the aluminum pigment is dispersed in water, a hydrogen gas is generated, and as a result, the aluminum pigment is whitened due to the generation of alumina. Hence, the water resistance is imparted by covering the surface of the aluminum pigment with a silica film, and the metallic gloss of the aluminum pigment is prevented from being lost due the whitening thereof.

The reaction temperature of the hydrolysis reaction is preferably 10° C. to 150° C. and more preferably 20° C. to 130° C. When the temperature is less than 10° C., since the hydrolysis reaction is slow, the formation of the silica film on the surface of the aluminum pigment is liable to be insufficient. When the temperature is more than 150° C., particular attention must be paid from a safety point of view.

The reaction time of the hydrolysis reaction is preferably 0.5 to 200 hours and more preferably 1 to 180 hours. When the reaction time is less than 0.5 hours, the hydrolysis reaction may not be sufficiently completed in some cases, and hence sufficient water resistance and water dispersibility may not be obtained. When the reaction time is more than 200 hours, the aluminum pigment may agglomerate in some cases.

The addition amount of TEOS may be determined by calculation so that the thickness of the silica film is 0.5 to 10 nm and preferably 5 nm. The reason for this is that when the thickness of the silica film is more than 10 nm, the metallic gloss may be decreased in some cases.

In particular, with respect to 1 part by mass of the aluminum pigment, the addition amount of TEOS is preferably 0.2 to 5 parts by mass, more preferably 0.5 to 4 parts by mass, and even more preferably 1 to 3 parts by mass. When the addition amount of TEOS is more than 5 parts by mass, the aluminum pigment dispersion may be whitely clouded in some cases due to unreacted TEOS. On the other hand, when the addition amount is less than 0.2 parts by mass, the hydroxyl group present on the surface of the aluminum pigment may not be completely covered in some cases.

In the first step, after TEOS is added, ammonia may also be added as a base catalyst. Ammonia can facilitate the hydrolysis reaction of TEOS.

With respect to 10 parts by mass of the aluminum pigment, the addition amount of ammonia is preferably 1 part by mass or less and more preferably 0.1 parts by mass or less. When the addition amount of ammonia is more than the range described above, the viscosity of the aluminum pigment dispersion increases, and the aluminum pigment in the aluminum pigment dispersion agglomerates, so that the metallic gloss cannot be maintained.

1.2. Second Step

In the second step of this embodiment, at least part of the organic solvent is removed from the aluminum pigment dispersion.

For removal of the organic solvent, the aluminum pigment provided with the silica film and the organic solvent are separated by operation, such as filtration, centrifugal sedimentation, or centrifugal separation, so that the organic solvent contained in the aluminum pigment dispersion is removed. Among the operations mentioned above, since the centrifugal separation is simple, the separation is preferably performed thereby to remove the organic solvent. By one of the methods described above, the organic solvent contained in the aluminum pigment dispersion is preferably removed in an amount of 70% or more and more preferably in an amount of 80% or more.

1.3. Third Step

In the third step of this embodiment, an aqueous surfactant solution obtained by dissolving a surfactant in water is added to the aluminum pigment dispersion and is then sufficiently stirred. In this embodiment, the first step, the second step, and the third step are preferably performed in that order. The reason for this is that when the aqueous surfactant solution is added in the third step after the second step is performed, the agglomeration of the aluminum pigment can be effectively prevented, and the dispersibility of the water resistant aluminum pigment dispersion can be improved.

In this specification, the case in which the third step of adding an aqueous surfactant solution is performed after the second step is referred to as "post-addition of surfactant". On the other hand, with respect to the post-addition of surfactant, the case in which the third step of adding an aqueous surfactant solution is performed before the second step is referred to as "pre-addition of surfactant". When the pre-addition of surfactant is performed, the effect of the surfactant is disturbed by the influence of the organic solvent, and as a result, the aluminum pigment may agglomerate in some cases.

In this step, the organic solvent in the aluminum pigment dispersion obtained in the previous step can be changed to an aqueous solvent by solvent replacement, so that a water resistant aluminum pigment dispersion having superior water dispersibility can be obtained. In addition, since the solvent of the water resistant aluminum pigment dispersion obtained in this step is an aqueous solvent base, the water resistant aluminum pigment dispersion can be easily applied to an aqueous ink composition.

Although the stirring time after the addition of the aqueous surfactant solution is not particularly limited, it is preferably 3 to 120 hours. When the stirring time is in the range described above, a water resistant aluminum pigment dispersion having superior water dispersibility can be obtained without degrading the metallic gloss. When the stirring time is more than 120 hours, the metallic gloss may be degraded in some cases due to agglomeration of the aluminum pigment.

As the water, pure water or ultrapure water, such as ion exchange water, ultrafiltration water, reverse osmosis water, or distilled water, is preferably used. In particular, water obtained by sterilizing the water mentioned above by ultraviolet radiation or addition of hydrogen peroxide is preferable since generation of fungi and bacteria can be suppressed for a long period of time.

As the surfactant, for example, an anionic surfactant, a cationic surfactant, a non-ionic surfactant, an ampholytic surfactant, or a high molecular weight surfactant may be used.

As the anionic surfactant, for example, there may be mentioned a higher fatty acid salt and an α-sulfo fatty acid methyl ester salt as a fatty acid-based surfactant; a liner alkylbenzene sulfonic acid salt as a linear alkylbenzene-based surfactant; an alkyl sulfuric ester salt, an alkyl ether sulfuric ester salt, an alkyl phosphate ester salt, and a dioctyl sulfosuccinate salt as a higher alcohol-based surfactant; an α-olefin sulfuric acid salt acid as an α-olefin-based surfactant; and an alkane sulfonic acid salt as a normal paraffin-based surfactant. However, the anionic surfactant is not limited to those mentioned above.

As the cationic surfactant, for example, there may be mentioned an alkyl trimethyl ammonium salt, a dialkyl dimethyl ammonium salt, and an alkyl dimethyl benzyl ammonium salt as a quaternary ammonium-based surfactant, and an N-methyl bis(hydroxyethyl)amine fatty acid ester hydrochloride salt as an amine salt-based surfactant. However, the cationic surfactant is not limited to those mentioned above.

As the non-ionic surfactant, for example, there may be mentioned a sucrose fatty acid ester, a sorbitan fatty acid ester, a polyoxyethylene sorbitan fatty acid ester, a polyoxyethylene fatty acid ester, and a fatty acid alkanol amide as a fatty acid-based surfactant, and a polyoxyethylene alkyl ether, an alkyl glycoside, and a polyoxyethylene alkylphenyl ether as an ether-based surfactant. However, the non-ionic surfactant is not limited to those mentioned above.

As the ampholytic surfactant, for example, there may be mentioned an alkyl amino fatty acid salt as an amino acid-based surfactant, an alkyl carboxyl betaine as a betaine-based surfactant, and an alkylamine oxide as an amine oxide-based surfactant. However, the ampholytic surfactant is not limited to those mentioned above.

As the high molecular weight surfactant, for example, a polycarboxylic acid-based, a naphthalene-based, a melamine-based, and an aminosulfonic acid-based high molecular weight surfactant may be mentioned. As the polycarboxylic acid-based surfactant, for example, there may be mentioned a copolymer of acrylic acid, methacrylic acid, maleic acid, or maleic anhydride with an olefin, styrene, or a polyoxyalkylene alkyl ether; a copolymer between acrylic acid and itaconic acid; a copolymer between methacrylic acid and itaconic acid; a copolymer between styrene and maleic acid or maleic anhydride; a copolymer between acrylic acid and methacrylic acid; a copolymer between acrylic acid and methyl acrylate; a copolymer between acrylic acid and vinyl acetate; a copolymer between acrylic acid and maleic acid or maleic anhydride; or a salt thereof (such as an alkali metal, an alkali earth metal, an ammonium, or an amine salt) may be mentioned. Those copolymers each may be any one of an alternate copolymer, a random copolymer, a block copolymer, a graft copolymer, and the like.

As the surfactant, among those mentioned above, a high molecular weight surfactant is preferable, at least one of polycarboxylic acids or salts thereof is more preferable, and at least one selected from the group consisting of the following copolymers A, B, and C is particularly preferable. The copolymers A, B, and C may be used alone or in combination.

The copolymers A, B, and C each have a bulky molecular structure. Hence, after being adsorbed on the surface of the aluminum pigment provided with the silica film, the copolymers A, B, and C can effectively suppress agglomeration between particles of the aluminum pigment provided with the silica film by a steric hindrance function derived from the molecular structure.

The copolymer A has a structural unit represented by the following general formula (1) or the following formula (2) and a structural unit represented by the general formula (3). The copolymer B has a structural unit represented by the following general formula (1) or the following formula (2) and a structural unit represented by the general formula (4). The copolymer C has a structural unit represented by the following general formula (1) or the following formula (2) and a structural unit represented by the general formula (5). The copolymers A, B, and C each may be any one of an alternate copolymer, a random copolymer, a block copolymer, a graft copolymer, and the like.

In the formula, $A_1$ and $A_2$ each independently indicate hydrogen, an alkali metal, or ammonium.

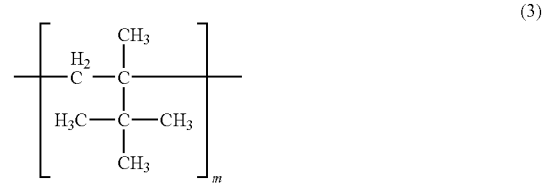

In the formula, m indicates an integer of 1 to 5.

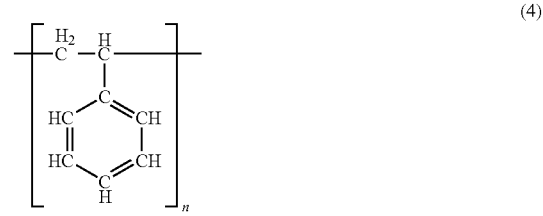

In the formula, n indicates an integer of 1 to 5.

In the formula, o indicates an integer of 1 to 5, and R indicates an alkyl group.

In the general formula (3), m is an integer of 1 to 5 and is preferably an integer of 1 to 3. In addition, n in the general formula (4) is an integer of 1 to 5 and is preferably an integer of 1 to 3. In addition, o in the general formula (5) is an integer of 1 to 5 and is preferably an integer of 1 to 3.

The weight average molecular weight of the copolymers A, B, and C are each preferably 2,000 to 500,000, and more preferably 10,000 to 100,000. When the weight average molecular weights of the copolymers A, B, and C are each more than the above range, the viscosity of the water resistant aluminum pigment dispersion is increased, and the dispersibility thereof is degraded. On the other hand, when the weight average molecular weights of the copolymers A, B, and C are each less than the above range, the steric hindrance effect of the surfactant cannot be expected, and the dispersibility of the water resistant aluminum pigment dispersion is degraded.

The weight average molecular weight is measured, for example, by a gel permeation chromatography (GPC) using tetrahydrofuran as a solvent and can be obtained as a polystyrene-converted molecular weight.

As the copolymer A, for example, Polystar-OM (trade name, manufactured by NOF Corporation) may be mentioned which is a copolymer including maleic acid and an olefin as structural units. As the copolymer B, for example, DSK-Discoat N-10 (trade name, manufactured by Dai-ichi Kogyo Seiyaku Co., Ltd.) may be mentioned which is a copolymer including maleic acid and styrene as structural units. As the copolymer C, for example, Malialim AKM-0531 (trade name, manufactured by NOF Corporation) may be mentioned which is a copolymer including maleic acid and polyoxypropylene alkyl ether as structural units. In addition, as the copolymer C, styrene may also be included as a structural unit.

With respect to 1 part by mass of the aluminum pigment, the addition amount of the surfactant is preferably 0.02 to 1.5 parts by mass, more preferably 0.03 to 1.3 parts by mass, and even more preferably 0.03 to 1.2 parts by mass. As the addition amount of the surfactant is more than the range described above, the dispersibility of the water resistant aluminum pigment dispersion may be degraded in some cases. On the other hand, when the addition amount is less than the above range, the aluminum pigment agglomerates, and as a result, the metallic gloss cannot be maintained.

With respect to the total mass of the water resistant aluminum pigment dispersion, the addition amount of the aqueous surfactant solution is preferably 70 mass percent or more and more preferably 80 mass percent or more.

2. Water Resistant Aluminum Pigment Dispersion

The water resistant aluminum pigment dispersion of this embodiment can be manufactured by the manufacturing steps described above. The water resistant aluminum pigment dispersion of this embodiment is characterized in that the water resistant aluminum pigment in which the aluminum pigment is covered with the silica film is dispersed in an aqueous solution containing at least one selected from the group consisting of the copolymers A, B, and C.

According to the water resistant aluminum pigment dispersion of this embodiment, since the silica film is formed on the surface of the aluminum pigment, the water resistance is imparted thereto, and even when being blended with an aqueous paint or an aqueous ink composition, the metallic gloss is not degraded. In addition, since the aluminum pigment covered with the silica film is dispersed in an aqueous solution containing at least one selected from the group consisting of the copolymers A, B, and C, a water resistant aluminum pigment dispersion having superior water dispersibility can be obtained without degrading the water resistance and the metallic gloss.

The water resistant aluminum pigment may be an aluminum pigment processed by a surface treatment using tetraethoxysilane. As described above, when the surface of the aluminum pigment is processed by tetraethoxysilane, a water resistant aluminum pigment having superior water resistance can be obtained.

The aluminum pigment preferably includes plate-shaped aluminum particles having an average thickness of 5 to 30 nm and a 50% average particle diameter (R50) of 0.5 to 3 μm.

As described above, when the average thickness of the particles of the aluminum pigment is 5 to 30 nm, a water resistant aluminum pigment having a superior metallic gloss can be formed. On the other hand, when the average thickness is less than 5 nm, the metallic gloss tends to decrease, and when the average thickness is more than 30 nm, the metallic gloss also tends to decrease.

As described above, when R50 of the aluminum pigment is 0.5 to 3 μm, a superior metallic gloss and printing stability can be ensured. When R50 is less than 0.5 μm, the metallic gloss may become insufficient. On the other hand, when R50 is more than 3 μm, the printing stability may be degraded in some cases.

The thickness of the silica film is preferably 0.5 to 10 nm and more preferably 1 to 9 nm. When the thickness of the silica film is less than 0.5 nm, sufficient water resistance and water dispersibility cannot be imparted to the aluminum pigment. On the other hand, when the thickness of the silica film is more than 10 nm, although the water resistance and the water dispersibility can be imparted to the aluminum pigment, the metallic gloss tends to decrease.

The surface condition of the water resistant aluminum pigment of this embodiment can be identified by an element analysis using an X-ray photoelectron spectroscopic method (hereinafter referred to as "XPS"). The principle of XPS will be roughly described.

XPS is a spectroscopic method in which energy of photoelectrons emitted from a sample by radiation of X-rays is measured. In the air, photoelectrons immediately collide with molecules and are scattered; hence, the inside of an apparatus must be placed in an evacuated state. In addition, photoelectrons emitted from a very deep position of a solid sample are scattered inside the sample and cannot escape therefrom. Accordingly, photoelectrons emitted only from a sample surface are measured by XPS, and hence XPS is an effective surface analytical method. In XPS, the range from the sample surface to a depth of several nanometers can be analyzed.

The kinetic energy E of a photoelectron which is observed is the value obtained by subtracting energy $\phi$ required to transfer an electron located in the crystal to the outside of the sample surface from $h\nu - E_K$, that is, the value represented by the following formula.

$$E = h\nu - E_K - \phi \quad (7)$$

In this formula, h indicates Planck's constant, ν indicates the number of frequency, and $E_K$ indicates the electron bond energy. From the above formula (7), it is understood that the value E varies depending on the energy of X-rays from an excitation source. As excited X-rays, in general, characteristic X-rays from an X-ray tube using an aluminum or a magnesium target are used. Although a measurement method of the electron energy is not particularly limited, as a representative method, there may be mentioned an electrostatic field method in which after electrons are introduced into an electrostatic field, only an electron moving along a predetermined trajectory is detected.

By XPS, the electron bond energy $E_K$ can be measured. Since the bond energy described above is fundamentally an intrinsic value of each element, the type of element can be identified. In addition, from the intensities of photoelectron spectra, the quantities of individual elements can also be determined.

Although incident X-rays enter the inside of a sample from the surface thereof, the mean free paths of excited photoelectrons are small such as 0.1 to several nanometers, and hence photoelectrons are emitted only from the vicinity of the sample surface. Hence, the analysis in the vicinity of the sample surface can be performed. However, in the case in which a plurality of layers is present in the vicinity of the sample surface, even when it is attempted to measure a small composition amount of each layer, accurate measurement may not be performed in some cases. The reason for this is that in the XPS measurement, a relative composition amount which is the average amount from the surface to a depth of several tens of angstroms is measured. When the compositions of several layers from the surface are measured, an angle dependence of the escape depth of photoelectrons may be used. That is, although photoelectrons are isotropically emitted from the sample surface, the escape depth of photoelectrons emitted from the solid surface varies depending on the photoelectron takeoff angle. When this phenomenon is used, the escape depth is decreased as the photoelectron takeoff angle is changed from the direction perpendicular to the sample surface to the inclined direction, and hence information in the vicinity closer to the sample surface can be obtained.

Figure 1B:
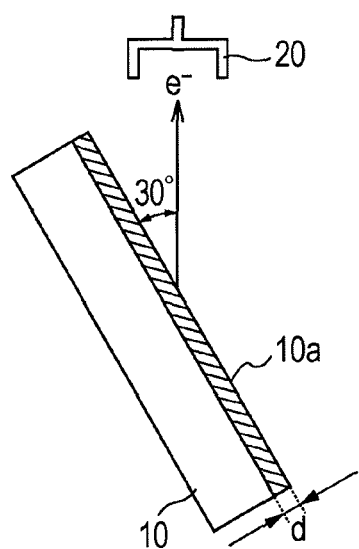

In this embodiment, the "photoelectron takeoff angle" indicates an angle formed between the sample surface and a detector. FIGS. 1A and 1B are views each schematically showing the photoelectron takeoff angle in the XPS measurement.

FIG. 1A shows the case in which the photoelectron takeoff angle is 90°. As shown in FIG. 1A, "the photoelectron takeoff angle is 90°" indicates the case in which an angle θ formed between a detector 20 and a surface 10a of a sample 10 is 90°. As shown in FIG. 1A, the escape depth of photoelectrons is maximized, and information from the sample surface 10a to a depth D can be detected.

FIG. 1B shows the case in which the photoelectron takeoff angle is 30°. As shown in FIG. 1B, in order to set the photoelectron takeoff angle to 30°, after the position of the detector 20 is fixed, adjustment was performed by inclining the sample 10 with respect to the detector 20. In the case of a photoelectron takeoff angle of 30°, an escape depth d of photoelectrons satisfies the formula represented by d=D·sin 30°=0.5D. Accordingly, since the escape depth is decreased when the photoelectron takeoff angle is set to 30°, information in the vicinity closer to the surface can be detected.

In the water resistant aluminum pigment dispersion of this embodiment, since the thickness of the silica film covering the aluminum pigment is preferably 0.5 to 10 nm as described above, although depending on the type of XPS apparatus, the photoelectron takeoff angle is preferably set to 10° to less than 45°. When the photoelectron takeoff angle is set in the range described above, the condition in the vicinity closer to the surface of the water resistant aluminum pigment can be identified.

The covering rate of the silica film on the surface of the water resistant aluminum pigment can be calculated from composition ratios of C, O, Al, and Si elements measured by XPS.

Hereinafter, a method for obtaining the covering rate of the silica film on the surface of the water resistant aluminum pigment from the composition ratios of C, O, Al, and Si elements measured by XPS will be described.

First, the composition ratios of C, O, Al, and Si elements obtained by the XPS measurement can be interpreted as follows.

(1) Al

Aluminum can be categorized into an Al element (Al) which is not bonded to oxygen and Al ($Al_O$) which is bonded to oxygen. After the peaks of Al-2p spectrum are separated, from the area ratio between the separated peaks, the ratio of the Al element (Al) which is not bonded to oxygen and the Al ($Al_O$) which is bonded to oxygen can be obtained.

(2) Si

Si can be categorized as Si ($Si_1$) derived from TEOS.

(3) O

Oxygen can be categorized into O ($O_0$) bonded to Al and O ($O_1$) bonded to Si.

(4) C

The detected C is parts of the organic solvent, the surfactant, and the like and cannot be considered as responsible for the formation of the coating film.

From the categorized elements described above, the covering rate of the silica film on the surface of the water resistant aluminum pigment can be obtained by the following formula (8).

$$\text{Covering Rate (\%)} = [(Si_1+O_1)/\{(Si_1+O_1)+(Al)+(Al_0+O_0)\}] \times 100 \quad (8)$$

The covering rate of the silica film on the water resistant aluminum pigment of this embodiment calculated by the above formula (8) is preferably 30% to 90% and more preferably 50% to 90%. When the covering rage is within the range described above, the water resistance can be imparted to the aluminum pigment, and even when being dispersed in water, the aluminum pigment is not whitened. When the covering rate is less than 30%, since a sufficient water resistance cannot be obtained, the aluminum pigment may be whitened, and/or since sufficient water dispersibility is not obtained, the aluminum pigment may be blackened due to the agglomeration thereof. On the other hand, in order to obtain a covering rate of more than 90%, technical difficulties may arise.

3. Aqueous Ink Composition

The aqueous ink composition of this embodiment is characterized in that the water resistant aluminum pigment dispersion described above is contained. In this specification, the "aqueous ink composition" indicates an ink composition containing 70 mass percent or more of water as a solvent. As the water, pure water or ultrapure water, such as ion exchange water, ultrafiltration water, reverse osmosis water, or distilled water, is preferably used. In particular, water obtained by sterilizing the water mentioned above by ultraviolet radiation or addition of hydrogen peroxide is preferable since generation of fungi and bacteria can be suppressed for a long period of time.

With respect to the total mass of the aqueous ink composition, the concentration of the aluminum pigment in the aqueous ink composition of this embodiment is preferably 0.1 to 3.0 mass percent, more preferably 0.25 to 2.5 mass percent, and particularly preferably 0.5 to 2.0 mass percent.

The aqueous ink composition of this embodiment may contain a resin or a derivative thereof, a surfactant, an alkanediol, a polyalcohol, a pH adjuster, and the like.

The resin or its derivative functions to tightly fix the aluminum pigment to a recording medium. As a component of the resin or its derivative, for example, there may be mentioned a homopolymer or a copolymer of acrylic acid, an acrylic ester, methacrylic acid, a methacrylic ester, acrylonitrile, cyanoacrylate, acrylamide, an olefin, styrene, vinyl acetate, vinyl chloride, vinyl alcohol, vinyl ether, vinyl pyrrolidone, vinyl pyridine, vinyl carbazole, vinyl imidazole, vinylidene chloride, or the like, a urethane resin, a fluorinated resin, or a natural resin. In addition, as the copolymer, any one of a random copolymer, a block copolymer, an alternate copolymer, and a graft copolymer may be used.

As the surfactant, an acetylene glycol-based surfactant or a polysiloxane-based surfactant is preferably contained. The acetylene glycol-based surfactant and the polysiloxane-based surfactant can enhance an impregnation property of ink by improving the wettability to a recording surface of a recording medium or the like. As the acetylene glycol-based surfactant, for example, there may be mentioned 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol. In addition, as the acetylene glycol-based surfactant, a commercially available product may also be used, and for example, there may be mentioned Olfin E1010, STG, and Y (all manufactured by Nisshin Chemical Co., Ltd.) and Surfinol 104, 82, 465, 485, and TG (all manufactured by Air Products and Chemicals Inc.) As the polysiloxane-based surfactant, a commercially available product may be used, and for example, there may be mentioned BYK-347 and BYK-348 (manufactured by BYK Japan K.K.). Furthermore, the aqueous ink composition may also contain another surfactant, such as an anionic surfactant, a nonionic surfactant, or an ampholytic surfactant.

An alkanediol can enhance the impregnation property of ink by improving the wettability to a recording surface of a recording medium or the like. As the alkanediol, a 1,2-alkanediol having 4 to 8 carbon atoms, such as 1,2-butanediol, 1,2-pentanediol, 1,2-hexanediol, 1,2-heptanediol, or 1,2-octanediol, is preferable. Among those mentioned above, 1,2-hexanediol, 1,2-heptanediol, or 1,2-octanediol is more preferable since its impregnation property to a recording medium is particularly superior.

For example, when an aqueous ink composition is applied to an ink jet recording apparatus, a polyalcohol can suppress the aqueous ink composition from being dried and/or can prevent the aqueous ink composition from clogging an ink jet recording head portion. As the polyalcohol, for example, ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane may be mentioned.

As the pH adjuster, for example, there may be mentioned potassium dihydrogen phosphate, disodium hydrogenphosphate, sodium hydroxide, lithium hydroxide, potassium hydroxide, ammonia, diethanolamine, triethanolamine, triisopropanolamine, potassium carbonate, sodium carbonate, or sodium hydrogen carbonate.

In addition, the aqueous ink composition of this embodiment may also contain at least one additive, such as a fixing agent including a water-soluble rosin, a fungicide/antiseptic including sodium benzoate, an antioxidant/UV absorber including an allophanate or a derivative thereof, a chelating agent, or an oxygen absorber. Those additives may be used alone, and of course, at least two of them may be used in combination.

Applications of the aqueous ink composition of this embodiment are not particularly limited, and for example, the aqueous ink composition may be applied, for example, to a writing tool, a stamp, a recorder, a pen plotter, and an ink jet recording apparatus.

The viscosity of the aqueous ink composition of this embodiment at 20° C. is preferably in the range of 2 to 10 mPa·s and more preferably in the range of 3 to 5 mPa·s. When the viscosity of the aqueous ink composition at 20° C. is in the range described above, an appropriate amount of the aqueous ink composition can be ejected from a nozzle, and trajectory deviation and scattering of the aqueous ink composition can be further reduced, so that the aqueous ink composition of this embodiment can be preferably used for an ink jet recording apparatus.

4. Examples

4.1 Example 1

A resin-layer coating liquid containing 3.0 mass percent of cellulose acetate butyrate (butylation rate: 35% to 39%, manufactured by Kanto Chemical Co., Inc.) and 97 mass percent of diethylene glycol diethyl ether (manufactured by Nippon Nyukazai Co., Ltd.) was uniformly applied on a PET film having a thickness of 100 μm by a bar-coating method and was then dried at 60° C. for 10 minutes, so that a resin layer thin film was formed on the PET film.

Next, an aluminum deposition layer having an average film thickness of 20 nm was formed on the above resin layer using a vacuum deposition apparatus ("VE-1010 type vacuum deposition apparatus" manufactured by Vacuum Device Inc.).

Next, the laminate formed by the method described above was simultaneously processed by peeling, particularization, and dispersion treatments using an ultrasonic dispersion apparatus VS-150 (manufactured by AS ONE Corporation) in diethylene glycol diethyl ether, and as a result, an aluminum pigment dispersion was obtained when a cumulative ultrasonic dispersion time was 12 hours.

The aluminum pigment dispersion thus obtained was processed by a filtration treatment using a SUS mesh filter with 5-μm openings, so that coarse and large particles were removed. Next, the filtrate was received in a round-bottom flask, and diethylene glycol diethyl ether was distilled out using a rotary evaporator. After the aluminum pigment dispersion was concentrated by the above step, the concentration of the aluminum pigment dispersion thus concentrated was adjusted, so that an aluminum pigment dispersion at a concentration of 5.0 mass percent was obtained.

Subsequently, after 5.0 g of the obtained aluminum pigment dispersion was charged in a beaker, and 0.57 g of TEOS which was a silica raw material and 0.1 g of ammonia water at a concentration of 1 mol/L which was a base catalyst were then added in the beaker, a hydrolysis reaction was performed by stirring at room temperature for 7 days. As a result, an aluminum pigment dispersion was obtained in which the surface of the aluminum pigment was covered with a silica film.

Next, the dispersion thus obtained was processed by centrifugal separation (10,000 rpm, 60 minutes), and as a result, the solvent contained in the aluminum pigment dispersion in which the silica film was formed was removed. Subsequently, while stirring was performed, an aqueous solution containing 0.2 mass percent of Polystar-OM (hereinafter referred to as "0.2% Polystar-OM aqueous solution") was added as a surfactant in an amount which was calculated so that the concentration of the aluminum pigment was 1.7 mass percent. As described above, a water resistant aluminum pigment dispersion A was obtained.

4.2 Example 2

Except that instead of the 0.2% Polystar-OM aqueous solution, an aqueous solution containing 1 mass percent of Polystar-OM (hereinafter referred to as "1% Polystar-OM aqueous solution") was used, a water resistant aluminum pigment dispersion B was obtained in a manner similar to that in the "4.1 Example 1".

Next, the water resistant aluminum pigment dispersion B thus obtained was equally divided into two portions, that is, water resistant aluminum pigment dispersions B-1 and B-2.

4.3 Example 3

Except that instead of the 0.2% Polystar-OM aqueous solution, an aqueous solution containing 2 mass percent of Polystar-OM was used, a water resistant aluminum pigment dispersion C was obtained in a manner similar to that in the "4.1 Example 1".

4.4 Example 4

In Example 4, after 5 g of the aluminum pigment dispersion at a concentration of 5.0 mass percent which was prepared in the "4.1 Example 1" was charged in a beaker, 0.57 g of TEOS and 0.1 g of ammonium water at a concentration of 0.1 mol/L were added and were stirred at room temperature for 7 days, so that a hydrolysis reaction was carried out. As a result, an aluminum pigment dispersion in which a silica film was formed on the surface of the aluminum pigment was obtained.

Next, the aluminum pigment dispersion was processed by centrifugal separation (10,000 rpm, 60 minutes), so that the solvent contained in the aluminum pigment dispersion in which the silica film was formed was removed. Subsequently, while stirring was performed, the 0.26 Polystar aqueous solution was added in an amount which was calculated so as to obtain an aluminum pigment concentration of 5.0 mass percent. Accordingly, a water resistant aluminum pigment dispersion D was obtained.

4.5 Example 5

Except that instead of Polystar-OM, Malialim AKM-0531 was used, a water resistant aluminum pigment dispersion E was obtained in a manner similar to that in the "4.1 Example 1".

4.6 Example 6

Except that instead of Polystar-OM, Malialim AKM-0531 was used, a water resistant aluminum pigment dispersion F was obtained in a manner similar to that in the "4.2 Example 2".

4.7 Example 7

Except that the base catalyst was not added, a water resistant aluminum pigment dispersion G was obtained in a manner similar to that in the "4.1 Example 1".

4.8 Example 8

Except that instead of the 0.2% Polystar-OM aqueous solution, an aqueous solution containing 0.1 mass percent of DSK-Discoat N-10 was used, a water resistant aluminum pigment dispersion H was obtained in a manner similar to that in the "4.1 Example 1".

4.9 Example 9

Except that instead of Polystar-OM, DSK-Discoat N-10 was used, a water resistant aluminum pigment dispersion I was obtained in a manner similar to that in the "4.2 Example 2".

4.10 Example 10

In Example 10, after the aluminum pigment dispersion at a concentration of 5.0 mass percent which was prepared in the "4.1 Example 1" was processed by centrifugal separation (12,000 rpm, 30 minutes), so that the solvent contained in the aluminum pigment dispersion was removed.

Subsequently, after tetrahydrofuran, which was an organic solvent used for washing, was added to the aluminum pigment thus separated, and stirring was performed for 24 hours, centrifugal separation was performed (12,000 rpm, 30 minutes), so that tetrahydrofuran was removed. The operation described above was performed twice.

Next, diethylene glycol diethyl ether was added to the aluminum pigment, and as a result, an aluminum pigment dispersion at a concentration of 5.0 mass percent was obtained.

Subsequently, after 5.0 g of the obtained aluminum pigment dispersion was charged in a beaker, 0.57 g of TEOS and 0.1 g of ammonia water at a concentration of 1 mol/L were added, and stirring was performed at room temperature for 6 days. Next, the temperature was increased, and stirring was performed at 105° C. for 5 hours, so that a hydrolysis reaction was carried out. As a result, an aluminum pigment dispersion was obtained in which the surface of the aluminum pigment was covered with a silica film.

Next, the dispersion thus obtained was processed by centrifugal separation (10,000 rpm, 60 minutes), and as a result, the solvent contained in the aluminum pigment dispersion in which the silica film was formed was removed. Subsequently, while stirring was performed, the 195 Polystar-OM aqueous solution was added in an amount which was calculated so that the concentration of the aluminum pigment was 1.7 mass percent. As described above, a water resistant aluminum pigment dispersion J was obtained.

4.11 Example 11

Except that the conditions of the hydrolysis reaction in the "4.10 Example 10" were changed in such a way that after stirring was performed at room temperature for 6 days, and the temperature was then increased, stirring was performed at 105° C. for 4 hours, and that after the temperature was further increased, stirring was performed at 115° C. for 5 hours, a water resistant aluminum pigment dispersion K was obtained in a manner similar to that in the "4.10 Example 10".

4.12 Comparative Example 1

Except that TEOS was not added, a water resistant aluminum pigment dispersion L was obtained in a manner similar to that in the "4.4 Example 4".

4.13 Comparative Example 2

In Comparative Example 2, after 5 g of the aluminum pigment dispersion at a concentration of 5.0 mass percent which was prepared in the "4.1 Example 1" was charged in a beaker, 0.57 g of TEOS and 0.1 g of ammonium water at a concentration of 1 mol/L were added thereto, and stirring was performed at room temperature for 1 day, so that a hydrolysis reaction was carried out.

Next, centrifugal separation (10,000 rpm, 60 minutes) was performed, so that the solvent was removed. Subsequently, while stirring was performed, distilled water was added so that the concentration of the aluminum pigment was 5.0 mass percent. Accordingly, a water resistant aluminum pigment dispersion M was obtained.

4.14 Comparative Example 3

Except that instead of Polystar-OM, Ceramo D-134 (ammonium polyacrylate, manufactured by Dai-ichi Kogyo Seiyaku Co., Ltd.) was used, a water resistant aluminum pigment dispersion N was obtained in a manner similar to that in the "4.2 Example 2".

4.15 Comparative Example 4

Except that instead of Polystar-OM, Shallol AH-103P (ammonium polyacrylate, manufactured by Dai-ichi Kogyo Seiyaku Co., Ltd.) was used, a water resistant aluminum pigment dispersion O was obtained in a manner similar to that in the "4.2 Example 2".

4.16 Comparative Example 5

Except that instead of Polystar-OM, Discoat N-509 (polyalkylene polyamine alkylene oxide adduct, manufactured by Dai-ichi Kogyo Seiyaku Co., Ltd.) was used, a water resistant aluminum pigment dispersion P was obtained in a manner similar to that in the "4.2 Example 2".

4.17 Comparative Example 6

Except that instead of Polystar-OM, Pitzcol K-30L (polyvinylpyrrolidone, manufactured by Dai-ichi Kogyo Seiyaku Co., Ltd.) was used, a water resistant aluminum pigment dispersion Q was obtained in a manner similar to that in the "4.2 Example 2".

4.18 Comparative Example 7

Except that instead of Polystar-OM, Plysurf M-208B (Polyoxyethylene lauryl ether phosphate ester monoethanolamine salt, manufactured by Dai-ichi Kogyo Seiyaku Co., Ltd.) was used, a water resistant aluminum pigment dispersion R was obtained in a manner similar to that in the "4.2 Example 2".

4.19 Comparative Example 8

Except that ammonium water at a concentration of 0.1 mol/L (base catalyst) was not added, a water resistant aluminum pigment dispersion S was obtained in a manner similar to that in the "4.13 Comparative Example 2".

4.20 Comparative Example 9

Except that instead of ammonium water at a concentration of 0.1 mol/L, 0.04 g of diethylamine was added, a water resistant aluminum pigment dispersion T was obtained in a manner similar to that in the "4.13 Comparative Example 2".

4.21 Comparative Example 10

Except that instead of TEOS, 0.57 g of tetramethoxysilane (hereinafter also referred to as "TMOS") was added, a water resistant aluminum pigment dispersion U was obtained in a manner similar to that in the "4.13 Comparative Example 2".

4.22 Comparative Example 11

Except that instead of TEOS, 0.57 g of methyl silicate 51 (methyl silicate condensed product, manufactured by Fuso Chemical Co., Ltd.) was added, a water resistant aluminum pigment dispersion V was obtained in a manner similar to that in the "4.13 Comparative Example 2".

4.23 Reference Example 1

In Reference Example 1, after 5.0 g of the aluminum pigment dispersion at a concentration of 5.0 mass percent which was prepared in the "4.1 Example 1" was charged in a beaker, 0.57 g of TEOS and 0.1 g of ammonia water at a concentration of 1 mol/L were then added in the beaker, and a hydrolysis reaction was performed by stirring at room temperature for 1 day. Next, after the 1% Polystar-OM aqueous solution was added, stirring was performed at room temperature for 5 days (pre-addition of surfactant). Subsequently, after the solvent was removed by centrifugal separation (10,000 rpm, 60 minutes), while stirring was performed, distilled water was added so that the aluminum pigment had a concentration of 5.0 mass percent. As a result, a water resistant aluminum pigment dispersion W was obtained.

4.24 Reference Example 2

Except that the surfactant was changed from Polystar-OM to Malialim AKM-0531, a water resistant aluminum pigment dispersion X was obtained in a manner similar to that in the "4.23 Reference Example 1".

4.25 Evaluation tests

4.25.1 Water Resistance Evaluation Test

After 2 mL of water was charged in a sample bottle, and 2 mL of one of the water resistant aluminum pigment dispersions (hereinafter simply referred to as "dispersions") A to X was further dripped, the mixture thus obtained was held at a constant temperature of 25° C. The change with time was observed by visual inspection, so that the water resistance of the dispersion was evaluated. The evaluation criteria are as follows. The results of the water resistance evaluation test are shown in Tables 1 to 3.

"AAA" Significantly superior water resistance (no whitening after 70 days)
"AA" Superior water resistance (no whitening after 30 days)
"A" Slightly superior water resistance (no whitening after 10 days)
"B" Inferior water resistance (occurrence of whitening after 10 days)
"C" Markedly inferior water resistance (occurrence of whitening after 7 days)

4.25.2 Dispersibility Evaluation Test

After 2 mL of water was charged in a sample bottle, and 2 mL of one of the obtained dispersions A to X was further dripped, the mixture thus obtained was held at a constant temperature of 25° C. The change with time was observed by visual inspection, so that the dispersibility of the dispersion was evaluated. The dispersibility of the dispersion was evaluated by an increase in viscosity thereof and blackening of the dispersion due to agglomeration among aluminum pigment particles. The evaluation criteria are as follows. The results of the dispersibility evaluation test are shown in Tables 1 to 3.

"AAA" Significantly superior dispersibility
"AA" Superior dispersibility
"A" Slightly superior dispersibility
"B" Inferior dispersibility
"C" Markedly inferior dispersibility 4.25.3 Gloss Evaluation Test After one of the dispersions A to X was dripped/applied to printing paper (PM photo paper (gloss) model No. KA450PSK, manufactured by Seiko Epson Corporation), drying was performed at room temperature for 1 day. The sample thus obtained was observed by visual inspection and a scanning electron microscope (S-4700 manufactured by Hitachi High-Technologies Corporation, hereinafter referred to as "SEM"), so that the gloss of the aluminum pigment was evaluated. The evaluation criteria of the gloss of the aluminum pigment are as follows. The results of the gloss evaluation test are shown in Tables 1 to 3.

"AA" Superior gloss (having superior metallic gloss and mirror surface gloss)
"A" Slightly superior gloss (having superior metallic gloss but slightly matte touch)
"B" Inferior gloss (having matte touch)

TABLE 1

| | | EXAMPLE 1 | EXAMPLE 2 | | EXAMPLE 3 | EXAMPLE 4 | EXAMPLE 5 |
|---|---|---|---|---|---|---|---|
| TYPE OF WATER RESISTANT ALUMINUM PIGMENT DISPERSION | | A | B-1 | B-2 | C | D | E |
| ALUMINUM PIGMENT CONCENTRATION (MASS PERCENT) | | 1.7 | 1.7 | | 1.7 | 5.0 | 1.7 |
| SURFACTANT | TYPE | POLYSTAR-OM | POLYSTAR-OM | | POLYSTAR-OM | POLYSTAR-OM | MALIALIM AKM-0531 |
| | ADDITION AMOUNT (MASS PERCENT) | 0.19 | 0.94 | | 1.88 | 0.16 | 0.19 |
| | ADDITION TIMING | POST-ADDITION | POST-ADDITION | | POST-ADDITION | POST-ADDITION | POST-ADDITION |
| SILICA RAW MATERIAL | TYPE | TEOS | TEOS | | TEOS | TEOS | TEOS |
| | ADDITION AMOUNT (MASS PERCENT) | 3.9 | 3.9 | | 3.9 | 11.4 | 3.9 |
| BASE CATALYST | TYPE | 0.1 mol/L $NH_3aq$ | 0.1 mol/L $NH_3aq$ | | 0.1 mol/L $NH_3aq$ | 0.1 mol/L $NH_3aq$ | 0.1 mol/L $NH_3aq$ |
| | ADDITION AMOUNT (MASS PERCENT) | 0.68 | 0.68 | | 0.68 | 2.0 | 0.68 |
| EVALUATION RESULT | WATER RESISTANCE (WHITENING TEST) | AAA | AAA | AAA | AA | AAA | AAA |
| | DISPERSIBILITY | AA | AAA | AAA | A | AA | A |
| | GLOSS | AA | AA | AA | A | A | AA |

| | | EXAMPLE 6 | EXAMPLE 7 | EXAMPLE 8 | EXAMPLE 9 | EXAMPLE 10 | EXAMPLE 11 |
|---|---|---|---|---|---|---|---|
| TYPE OF WATER RESISTANT ALUMINUM PIGMENT DISPERSION | | F | G | H | I | J | K |
| ALUMINUM PIGMENT CONCENTRATION (MASS PERCENT) | | 1.7 | 1.7 | 1.7 | 1.7 | 1.7 | 1.7 |
| SURFACTANT | TYPE | MALIALIM AKM-0531 | POLYSTAR-OM | DSK-DISCOAT N-10 | DSK-DISCOAT N-10 | POLYSTAR-OM | POLYSTAR-OM |
| | ADDITION AMOUNT (MASS PERCENT) | 0.94 | 0.19 | 0.095 | 0.94 | 0.94 | 0.94 |
| | ADDITION TIMING | POST-ADDITION | POST-ADDITION | POST-ADDITION | POST-ADDITION | POST-ADDITION | POST-ADDITION |
| SILICA RAW MATERIAL | TYPE | TEOS | TEOS | TEOS | TEOS | TEOS | TEOS |
| | ADDITION AMOUNT (MASS PERCENT) | 3.9 | 3.9 | 3.9 | 3.9 | 3.9 | 3.9 |
| BASE CATALYST | TYPE | 0.1 mol/L $NH_3aq$ | — | 0.1 mol/L $NH_3aq$ | 0.1 mol/L $NH_3aq$ | 0.1 mol/L $NH_3aq$ | 0.1 mol/L $NH_3aq$ |
| | ADDITION AMOUNT (MASS PERCENT) | 0.68 | — | 0.68 | 0.68 | 0.68 | 0.68 |
| EVALUATION RESULT | WATER RESISTANCE (WHITENING TEST) | AAA | AA | AAA | AAA | AAA | AAA |
| | DISPERSIBILITY | AA | AA | AAA | AA | AAA | AAA |
| | GLOSS | AA | AA | AA | AA | AA | AA |

TABLE 2

|  |  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|---|
| TYPE OF WATER RESISTANT ALUMINUM PIGMENT DISPERSION | | L | M | N | O | P | Q |
| ALUMINUM PIGMENT CONCENTRATION (MASS PERCENT) | | 5.0 | 5.0 | 1.7 | 1.7 | 1.7 | 1.7 |
| SURFACTANT | TYPE | POLYSTAR-OM | — | CERAMO D-134 | SHALLOL AH-103P | DISCOAT N-509 | PITZCOL K-30L |
| | ADDITION AMOUNT (MASS PERCENT) | 0.18 | — | 0.94 | 0.94 | 0.94 | 0.94 |
| | ADDITION TIMING | POST-ADDITION | — | POST-ADDITION | POST-ADDITION | POST-ADDITION | POST-ADDITION |
| SILICA RAW MATERIAL | TYPE | — | TEOS | TEOS | TEOS | TEOS | TEOS |
| | ADDITION AMOUNT (MASS PERCENT) | — | 11.4 | 3.9 | 3.9 | 3.9 | 3.9 |
| BASE CATALYST | TYPE | 0.1 mol/L $NH_3$aq | 0.1 mol/L $NH_3$aq | 0.1 mol/L $NH_3$aq | 0.1 mol/L $NH_3$aq | 0.1 mol/L $NH_3$aq | 0.1 mol/L $NH_3$aq |
| | ADDITION AMOUNT (MASS PERCENT) | 2.0 | 2.0 | 0.68 | 0.68 | 0.68 | 0.68 |
| EVALUATION RESULT | WATER RESISTANCE (WHITENING TEST) | C | A | A | AA | AA | AA |
| | DISPERSIBILITY | AA | B | C | C | B | C |
| | GLOSS | AA | B | B | B | B | B |

|  |  | COMPARATIVE EXAMPLE 7 | COMPARATIVE EXAMPLE 8 | COMPARATIVE EXAMPLE 9 | COMPARATIVE EXAMPLE 10 | COMPARATIVE EXAMPLE 11 |
|---|---|---|---|---|---|---|
| TYPE OF WATER RESISTANT ALUMINUM PIGMENT DISPERSION | | R | S | T | U | V |
| ALUMINUM PIGMENT CONCENTRATION (MASS PERCENT) | | 1.7 | 5.0 | 5.0 | 5.0 | 5.0 |
| SURFACTANT | TYPE | PLYSURF M-208B | — | — | — | — |
| | ADDITION AMOUNT (MASS PERCENT) | 0.94 | — | — | — | — |
| | ADDITION TIMING | POST-ADDITION | — | — | — | — |
| SILICA RAW MATERIAL | TYPE | TEOS | TEOS | TEOS | TEOS | METHYL SILICATE 51 |
| | ADDITION AMOUNT (MASS PERCENT) | 3.9 | 11.4 | 11.4 | 11.4 | 11.4 |
| BASE CATALYST | TYPE | 0.1 mol/L $NH_3$aq | — | DIETHYLAMINE | 0.1 mol/L $NH_3$aq | 0.1 mol/L $NH_3$aq |
| | ADDITION AMOUNT (MASS PERCENT) | 0.68 | — | 0.8 | 2.0 | 2.0 |
| EVALUATION RESULT | WATER RESISTANCE (WHITENING TEST) | AAA | A | — | B | A |
| | DISPERSIBILITY | C | B | C | A | C |
| | GLOSS | C | B | — | A | B |

TABLE 3

|  |  | REFERENCE EXAMPLE 1 | REFERENCE EXAMPLE 2 |
|---|---|---|---|
| TYPE OF WATER RESISTANT ALUMINUM PIGMENT DISPERSION | | W | X |
| ALUMINUM PIGMENT CONCENTRATION (MASS PERCENT) | | 5.0 | 5.0 |
| SURFACTANT | TYPE | POLYSTAR-OM | MALIALIM AKM-0531 |
| | ADDITION AMOUNT (MASS PERCENT) | 0.82 | 0.82 |
| | ADDITION TIMING | PRE-ADDITION | PRE-ADDITION |
| SILICA RAW MATERIAL | TYPE | TEOS | TEOS |
| | ADDITION AMOUNT (MASS PERCENT) | 11.4 | 11.4 |
| BASE CATALYST | TYPE | 0.1 mol/L $NH_3$aq | 0.1 mol/L $NH_3$aq |
| | ADDITION AMOUNT (MASS PERCENT) | 2.0 | 2.0 |
| EVALUATION RESULT | WATER RESISTANCE (WHITENING TEST) | A | AA |
| | DISPERSIBILITY | B | B |
| | GLOSS | B | B |

4.25.4 Measurement of Covering Rate of Silica Film (1) Measurement Conditions 1

One of the dispersions A to G, J to M, and S to X which were obtained immediately after the process described above was dripped to a polytetrafluoroethylene-made membrane filter and was then dried, so that a sample for measuring a covering rate was obtained. Next, the sample for measuring a covering rate was fixed to a sample stage of an X-ray photoelectron spectroscopic apparatus described below, and the presence ratios of C, O, Si, and Al of the surface of the water resistant aluminum pigment were measured under the following measurement conditions 1.

Measurement Conditions 1
X-ray photoelectron spectroscopic apparatus: ESCA 5800 (manufactured by Ulvac phi Inc.)
X-ray source: Mg—Kα ray
X-ray radiation angle: 30°

In addition, from the obtained presence ratios of the individual elements, the covering rate of the silica film in the water resistant aluminum pigment was calculated by the above formula (8). The presence ratios of the individual elements and the covering rate of the silica film are shown in Tables 4 and 5.

In Al (atomic percent) shown in Tables 4 and 5, as described above, Al present in the form of an Al element and Al present in the form of Al—O are included. When the peaks thereof are separated from each other, the ratio of Al in the form of an Al element to Al present in the form of Al—O can be obtained. As a result, in Examples 1 to 7, Example 10, Comparative Examples 1 and 2, Comparative Examples 8 to 11, and Reference Examples 1 and 2, the ratio of Al in the form of an Al element was 18%, and the ratio of Al in the form of Al—O was 82%. In addition, in Example 11, the ratio of Al in the form of an Al element was 20%, and the ratio of Al in the form of Al—O was 80%.

TABLE 4

| | | EXAMPLE 1 | EXAMPLE 2 | EXAMPLE 3 | EXAMPLE 4 |
|---|---|---|---|---|---|
| TYPE OF WATER RESISTANT ALUMINUM PIGMENT DISPERSION | | A | B-1 | B-2 | C | D |
| XPS MEASUREMENT RESULT UNDER MEASUREMENT CONDITIONS (1) (atom %) | C | 20.4 | 21.1 | 17.7 | 23.5 | 22.1 |
| | O | 53.6 | 53.6 | 55.8 | 52.6 | 52.6 |
| | Al | 9.5 | 8.1 | 7.2 | 10.3 | 11.3 |
| | Si | 16.5 | 17.2 | 19.3 | 13.6 | 14.0 |
| COVERING RATE (%) | | 69.5 | 72.7 | 78.4 | 61.8 | 60.6 |

| | | EXAMPLE 5 | EXAMPLE 6 | EXAMPLE 7 | EXAMPLE 10 | EXAMPLE 11 |
|---|---|---|---|---|---|---|
| TYPE OF WATER RESISTANT ALUMINUM PIGMENT DISPERSION | | E | F | G | J | K |
| XPS MEASUREMENT RESULT UNDER MEASUREMENT CONDITIONS (1) (atom %) | C | 19.7 | 20.2 | 19.1 | 15.6 | 13.4 |
| | O | 54.6 | 53.6 | 55.0 | 56.4 | 57.4 |
| | Al | 8.2 | 7.4 | 7.9 | 12.0 | 12.7 |
| | Si | 17.5 | 18.8 | 17.9 | 16.0 | 16.6 |
| COVERING RATE (%) | | 73.8 | 76.6 | 74.6 | 64.4 | 64.0 |

TABLE 5

| | | COMPARATIVE EXAMPLE 1 | COMPARATIVE EXAMPLE 2 | COMPARATIVE EXAMPLE 8 | COMPARATIVE EXAMPLE 9 |
|---|---|---|---|---|---|
| TYPE OF WATER RESISTANT ALUMINUM PIGMENT DISPERSION | | L | M | S | T |
| XPS MEASUREMENT RESULT UNDER MEASUREMENT CONDITIONS (1) (atom %) | C | 27.8 | 18.4 | 18.9 | 22.4 |
| | O | 46.3 | 58.9 | 58.0 | 57.0 |
| | Al | 23.6 | 17.6 | 18.5 | 16.7 |
| | Si | 2.3 | 5.1 | 4.6 | 3.9 |
| COVERING RATE (%) | | 27.9 | 26.0 | 22.9 | 16.9 |

| | | COMPARATIVE EXAMPLE 10 | COMPARATIVE EXAMPLE 11 | REFERENCE EXAMPLE 1 | REFERENCE EXAMPLE 2 |
|---|---|---|---|---|---|
| TYPE OF WATER RESISTANT ALUMINUM PIGMENT DISPERSION | | U | V | W | X |
| XPS MEASUREMENT RESULT UNDER MEASUREMENT CONDITIONS (1) (atom %) | C | 16.5 | 23.6 | 28.8 | 24.0 |
| | O | 59.0 | 48.5 | 46.4 | 48.2 |
| | Al | 19.1 | 22.6 | 19.0 | 21.4 |
| | Si | 5.4 | 5.3 | 5.9 | 6.4 |
| COVERING RATE (%) | | 25.7 | 20.0 | 29.4 | 29.6 |

(2) Measurement Conditions 2

Besides the measurement performed under the "(1) measurement conditions 1", the presence ratios of C, O, Si, and Al of the surface of each of the aluminum pigments of the dispersions J and K were measured under the following measurement conditions 2.

Measurement Conditions 2

X-ray photoelectron spectroscopic apparatus: ESCA 1000 (manufactured by Ulvac phi Inc.)

X-ray source: monochromatic Al—Kα ray

X-ray radiation angle: 15°

In addition, from the obtained presence ratios of the individual elements, the covering rate of the silica film in the water resistant aluminum pigment was calculated by the above formula (8). The presence ratios of the individual elements and the covering rate of the silica film are shown in Table 6.

In Example 10 shown in Table 6, the ratio of Al in the form of an Al element was 18%, and the ratio of Al in the form of Al—O was 82%. In addition, in Example 11 shown in Table 6, the ratio of Al in the form of an Al element was 16%, and the ratio of Al in the form of Al—O was 84%.

TABLE 6

|  |  | EXAMPLE 10 | EXAMPLE 11 |
|---|---|---|---|
| TYPE OF WATER RESISTANT ALUMINUM PIGMENT DISPERSION |  | J | K |
| XPS MEASUREMENT RESULT UNDER MEASUREMENT CONDITIONS (2) (atom %) | C | 18.7 | 18.2 |
|  | O | 52.2 | 54.0 |
|  | Al | 16.2 | 14.3 |
|  | Si | 12.9 | 13.5 |
| COVERING RATE (%) |  | 51.9 | 55.7 |

(3) Measurement Conditions 3

Besides the measurement performed under the above "(1) measurement 1", in order to confirm the change of the covering rate of the silica film with time, a test was performed on the dispersion B-2 of Example 2 under the following conditions.

In particular, after the dispersion B-2 of Example 2 was held at a constant temperature of 25° C. for 140 days, the presence ratios of C, O, Si, and Al were measured by a test method performed under conditions similar to the above "(1) measurement conditions 1".

In addition, from the obtained presence ratios of the individual elements, the covering rate of the silica film in the water resistant aluminum pigment was calculated by the above formula (8). The presence ratios of the individual elements and the covering rate of the silica film are shown in Table 7.

In Example 2 shown in Table 7, the ratio of Al in the form of an Al element was 18%, and the ratio of Al in the form of Al—O was 82%.

TABLE 7

|  |  | EXAMPLE 2 |
|---|---|---|
| TYPE OF WATER RESISTANT ALUMINUM PIGMENT DISPERSION |  | B-2 |
| XPS MEASUREMENT RESULT UNDER | C | 24.5 |
|  | O | 51.3 |

TABLE 7-continued

|  |  | EXAMPLE 2 |
|---|---|---|
| MEASUREMENT CONDITIONS (3) (atom %) | Al | 5.7 |
|  | Si | 18.5 |
| COVERING RATE (%) |  | 81.1 |

4.25.5 Observation by SEM and TEM (1) Observation by SEM

Figure 2:
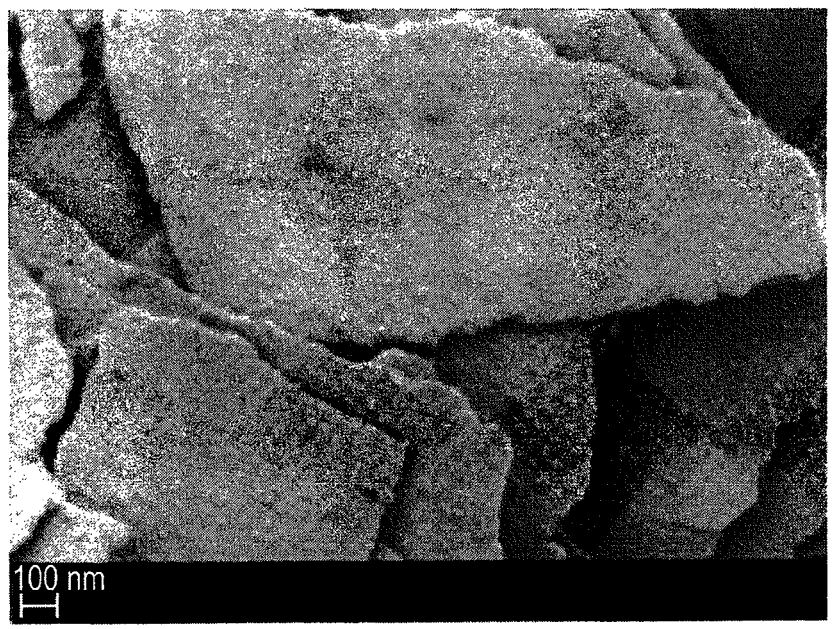
FIG. 2 is a SEM image showing a surface condition of a water resistant aluminum pigment in a water resistant aluminum pigment dispersion of this embodiment.

After the dispersion A was dripped/applied to printing paper (PM photo paper (gloss) model No. KA450PSK, manufactured by Seiko Epson Corporation), drying was performed at room temperature for 1 day. The surface condition of the sample thus obtained was observed by a SEM (S-4700 manufactured by Hitachi High-Technologies Corporation). The SEM image is shown in FIG. 2.

(2) Observation by TEM

Figure 3:
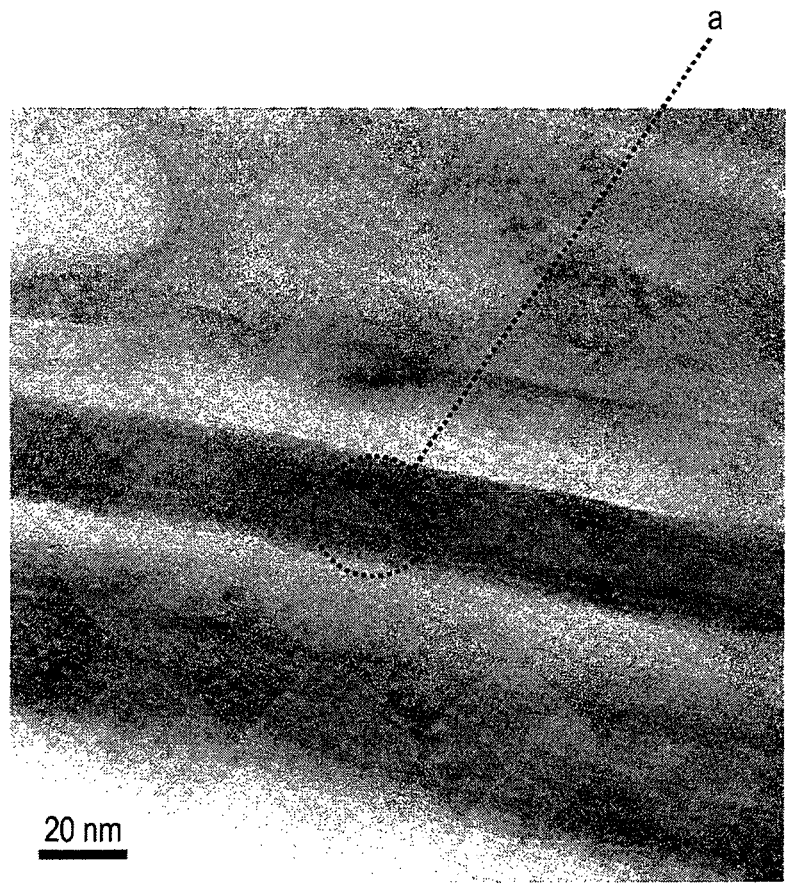
FIG. 3 is a TEM image showing a cross-sectional condition of the water resistant aluminum pigment in the water resistant aluminum pigment dispersion of this embodiment.
Figure 4:
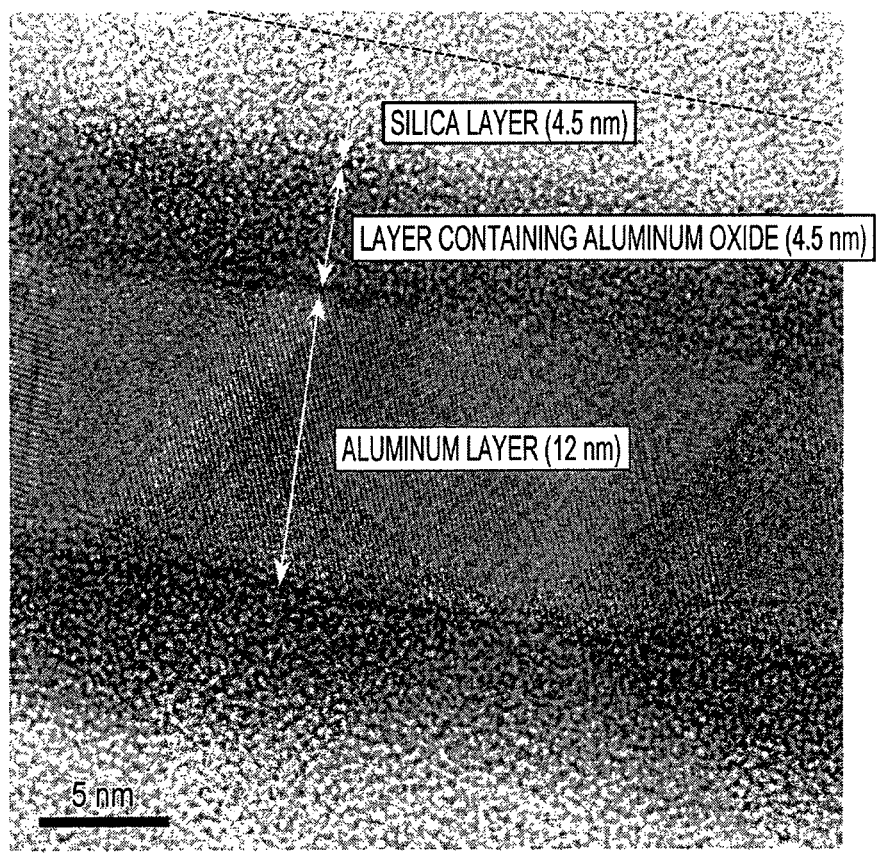
FIG. 4 is a TEM image showing a cross-sectional condition of the water resistant aluminum pigment in the water resistant aluminum pigment dispersion of this embodiment.
Figure 5:
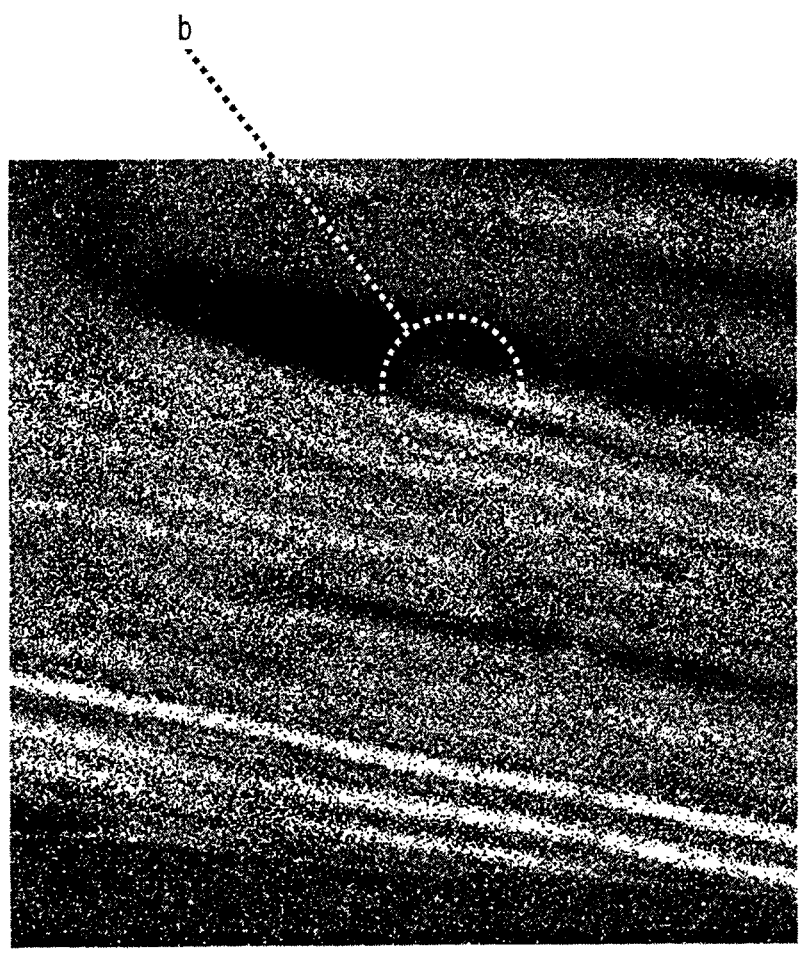
FIG. 5 is a TEM image showing a cross-sectional condition of the water resistant aluminum pigment in the water resistant aluminum pigment dispersion of this embodiment.

The cross-sectional condition of the sample obtained by the above "4.25.5(1)" was observed using a transmission electron microscope TecnaiG2f30 (manufactured by Philips Company, hereinafter referred to as "TEM"). The TEM images are shown in FIGS. 3 to 5.

4.25.6 Evaluation of Degree of Gloss of Aqueous Ink Composition (1) Preparation of Aqueous Ink Composition (Example 12 and Reference Example 3)

In order to obtain the composition shown in Table 8, after ion exchange water was added to 58.8 parts by mass of the dispersion A prepared in the above "4.1 Example 1", 10 parts by mass of glycerin, 5 parts by mass of trimethylolpropane, 1 part by mass of 1,2-hexanediol, 1 part by mass of Olfin E1010 (acetylene glycol-based surfactant, manufactured by Nisshin Chemical Co., Ltd.), and 1 part by mass of triethanolamine so that the total mass was 100 parts by mass, mixing and stirring were then carried out. Accordingly, an aqueous ink composition A of Example 12 containing 1 mass percent of the aluminum pigment was obtained.

In addition, except that in the preparation of the above aqueous ink composition A, 20 parts by mass of the dispersion W was added instead of the dispersion A, an aqueous ink composition W of Reference Example 3 containing 1 mass percent of the aluminum pigment was obtained in a manner similar to that described above.

(2) Formation of Evaluation Sample

As an exclusive cartridge of an ink jet printer PX-G930 (manufactured by Seiko Epson Corporation), an ink cartridge filled with the above aqueous ink composition was formed. Next, the obtained ink cartridge was fitted to a black line of the ink jet printer PX-G930, and commercially available ink cartridges were fitted to the other nozzle lines. Since the commercially available ink cartridges fitted to the lines other than the black line were each used as a dummy and were not used for the evaluation in this example, the effects of the invention were not influenced thereby.

Next, by using the above printer, the aqueous ink composition fitted to the black line was ejected to photo paper <gloss> (manufactured by Seiko Epson Corporation), so that a recording material on which a solid pattern image was printed was obtained. As the printing conditions, an ejected ink weight per one dot was set to 20 ng, and the resolution was set to 720 dpi by 720 dpi.

(3) Evaluation Method of Image

The degree of gloss at 60° of the obtained image was measured by a gloss meter, MULTI Gloss 268 (manufactured by Konica Minolta Co., Ltd.). The evaluation criteria of the degree of gloss of the obtained image are as follows. The results of the evaluation test of the degree of gloss are shown in Table 8.

"A": Degree of gloss of 300 or more (clear metallic gloss)
"B": Degree of gloss of 250 to less than 300 (matte metallic gloss)
"C": Degree of gloss of 200 to less than 250 (no metallic gloss)
"D": Measurement not available (ejection of aqueous ink composition being not available)

In addition, as shown in Tables 4 and 7, it was confirmed that even when 140 days passed, the covering rate in the dispersion B-2 of Example 2 was equivalent to that immediately after the aluminum pigment was dispersed. Hence, it was shown that in the dispersion B-2 of Example 2, a superior silica film was formed on the surface of the aluminum pigment, the dispersibility thereof was superior, and the water resistance of the aluminum pigment contained in the dispersion B-2 was superior.

FIG. 2 is a SEM image showing the surface condition of a sample formed using the dispersion A of Example 1. Accordingly, it was confirmed that plate-shaped particles of the aluminum pigment were disposed on a recording medium so as to be overlapped with each other. In addition, FIG. 3 is a TEM

TABLE 8

|  |  | EXAMPLE 12 | REFERENCE EXAMPLE 3 |
|---|---|---|---|
| TYPE OF AQUEOUS INK COMPOSITION | | A | W |
| ALUMINUM PIGMENT CONCENTRATION IN AQUEOUS INK COMPOSITION (MASS PERCENT) | | 1 | 1 |
| WATER RESISTANT ALUMINUM PIGMENT DISPERSION | TYPE | A | W |
| | ADDITION AMOUNT (MASS PERCENT) | 58.8 | 20 |
| POLYALCOHOL | TYPE | GLYCERIN | GLYCERIN |
| | ADDITION AMOUNT (MASS PERCENT) | 10 | 10 |
| | TYPE | TRIMETHYLOLPROPANE | TRIMETHYLOLPROPANE |
| | ADDITION AMOUNT (MASS PERCENT) | 5 | 5 |
| ALKANEDIOL | TYPE | 1,2-HEXANEDIOL | 1,2-HEXANEDIOL |
| | ADDITION AMOUNT (MASS PERCENT) | 0.67 | 0.67 |
| SURFACTANT | TYPE | OLFIN E1010 | OLFIN E1010 |
| | ADDITION AMOUNT (MASS PERCENT) | 1 | 1 |
| pH ADJUSTER | TYPE | TRIETHANOLAMINE | TRIETHANOLAMINE |
| | ADDITION AMOUNT (MASS PERCENT) | 1 | 1 |
| ION EXCHANGE WATER | | BALANCE | BALANCE |
| EVALUATION RESULT | DEGREE OF GLOSS | 307 | NOT EJECTED |
| | EVALUATION OF DEGREE OF GLOSS | A | D |

4.25.7 Evaluation Results (1) Examples 1 to 12

In each of the dispersions A to K of Examples 1 to 11, the water resistant aluminum pigment which was the aluminum pigment covered with the silica film was dispersed in an aqueous solution containing at least one of the copolymers A, B, and C. Accordingly, as shown in Table 1, the results of the water resistant evaluation test, the dispersibility evaluation test, and the gloss evaluation test were superior, and a superior water resistant aluminum pigment dispersion could be obtained.

Among those mentioned above, it was confirmed that the dispersibility of each of the dispersions B-1 and B-2 of Example 2, the dispersion H of Example 8, the dispersion J of Example 10, and the dispersion K of Example 11 was significantly superior.

As shown in Table 4, in each of the dispersions A to G of Examples 1 to 7 and the dispersions J and K of Examples 10 and 11, the covering rate of the silica film was 30% or more. Since the dispersions A to G of Examples 1 to 7 and the dispersions J and K of Examples 10 and 11 each had superior water resistance, dispersibility, and gloss, it was suggested that when the covering rate of the silica film was 30% or more, the surface of the aluminum pigment was sufficiently covered with the silica film, and a superior silica film was formed.

image showing the cross-sectional condition of the sample formed using the dispersion A of Example 1, and it was confirmed that the particles of the aluminum pigment were disposed so as to be overlapped with each other.

FIG. 4 is an enlarged TEM image of the portion a shown in FIG. 3. As shown in FIG. 4, it was confirmed that in one flat-shaped aluminum pigment particle, the surface thereof was covered with a silica layer having a thickness of approximately 4.5 nm. Accordingly, it was shown that the aluminum pigment was sufficiently protected by the silica covering film, and that the water resistance was imparted thereby.

In addition, from FIG. 4, it was confirmed that between the aluminum layer and the silica layer, a layer having a thickness of approximately 4.5 nm and containing aluminum oxide was formed. It is believed that this layer containing aluminum oxide was generated after the hydrolysis reaction occurred between TEOS and a hydroxyl group present on the surface of the aluminum pigment and was derived from a hydroxyl group which was present on the surface of the aluminum pigment and which was not allowed to react with TEOS.

In addition, FIG. 5 is a TEM image showing the cross-sectional condition of the sample formed using the dispersion A of Example 1. As shown by b in FIG. 5, it was confirmed that at the end portion of the aluminum pigment, the silica film was also preferably formed. Accordingly, it was shown that the surface of the aluminum pigment was sufficiently protected by the silica film and that the water resistance of the aluminum pigment was improved by the silica film.

As shown in Table 8, it was shown by the result of the evaluation test of the degree of gloss that the aqueous ink composition A of Example 12 prepared by using the dispersion A of Example 1 had a superior metallic gloss. Accordingly, it was shown that the dispersion A of Example 1 can be preferably used for an ink jet recording apparatus.

(2) Comparative Examples 1 to 11, and Reference Examples 1 to 3

Since the step of adding TEOS was not performed for the dispersion L of Comparative Example 1, in the water resistance evaluation test, the water resistance was markedly inferior.

The dispersion M of Comparative Example 2 and the dispersion S of Comparative Example 8 did not contain the copolymers A, B, and C in the aqueous solvents. Hence, agglomeration occurred in the dispersibility evaluation test, and in addition, also in the gloss evaluation test, the gloss of the coating film could not be obtained.

The dispersions N to R of Comparative Examples 3 to 7 did not contain the copolymers A, B, and C in the aqueous solvents and contained surfactants other than those mentioned above. Hence, in the dispersibility evaluation test, agglomeration occurred, and in addition, in the gloss evaluation test, the gloss of the coating film could not be obtained.

The dispersion T of Comparative Example 9 did not contain the copolymers A, B, and C in the aqueous solvent and contained diethylamine as a base catalyst. As a result, since agglomeration markedly occurred, the water resistance evaluation test and the gloss evaluation test were stopped.

The dispersion U of Comparative Example 10 did not contain the copolymers A, B, and C in the aqueous solvent and also did not use TEOS as a silica raw material. As a result, the water resistance was not superior.

The dispersion V of Comparative Example 11 did not contain the copolymers A, B, and C in the aqueous solvent and also did not use TEOS as a silica raw material. Hence, in the dispersibility evaluation test, agglomeration occurred, and in addition, in the gloss evaluation test, the gloss of the coating film could not be obtained.

The dispersion W of Reference Example 1 and the dispersion X of Reference Example 2 were not superior in dispersibility and gloss of the coating film. Hence, it was shown that when the pre-addition of surfactant was performed, the dispersibility of the water resistant aluminum pigment dispersion and the gloss of the coating film were degraded.

In addition, as shown in Table 8, the aqueous ink composition W of Reference Example 3 prepared using the dispersion W of Reference Example 1 could not be ejected from the ink jet recording apparatus, and the degree of gloss could not be measured. Hence, it was shown that the dispersion W of Reference Example 1 was difficult to use for an ink jet recording apparatus.

The invention is not limited to the embodiments described above and may be variously modified and changed within the scope of the invention. For example, the invention may include configurations substantially the same as the configurations described in the embodiments (for example, a configuration having the same function, method, and result or a configuration having the same object and advantage). In addition, the invention may include configurations in which unessential portions in the configurations described in the embodiments are replaced with others. Also, the invention may include configurations that have the same operations and effects or configurations that achieve the same objects as the configurations described in the embodiments. Furthermore, the invention may include configurations that have known techniques added to the configurations described in the embodiments.

What is claimed is:

1. An ink composition comprising a water resistant aluminum pigment and water,
    wherein the water resistant aluminum pigment is formed of an aluminum pigment having an average thickness from 5 nm to 30 nm and a covering film which contains Si and is formed on the surface of the aluminum pigment; and
    wherein the coverage ratio of the surface of the aluminum pigment by the covering film, calculated from the composition ratio of C, O, Al, and Si detected by XPS measurement at an incident angle of 30°, is in a range from 30% to 90%.

2. The ink composition according to claim 1, wherein the covering film has a thickness from 0.5 nm to 10 nm.

3. The ink composition according to claim 1, wherein the aluminum pigment is plate-shaped aluminum particles.

4. The ink composition according to claim 1, wherein the aluminum pigment has a 50% average particle diameter from 0.5 μm to 3 μm.

5. The ink composition according to claim 1, wherein the covering film has a thickness from 1 to 9 nm.

6. The ink composition according to claim 1, wherein the coverage ratio is in a range of 50% to 90%.

7. The ink composition according to claim 6, wherein the covering film has a thickness from 1 to 9 nm.

8. The ink composition according to claim 7, wherein the coverage ratio is at least 60.6%.

* * * * *